United States Patent
Victa et al.

(10) Patent No.: US 12,170,892 B2
(45) Date of Patent: *Dec. 17, 2024

(54) MAINTENANCE OF WIRELESS DEVICES BY ELECTRONIC DEVICES

(71) Applicant: Apple Inc., Cupertino, CA (US)

(72) Inventors: Kenneth U. Victa, Cupertino, CA (US); Benjamin A. Detwiler, Menlo Park, CA (US); Nikhil Nilakantan, Cupertino, CA (US); Todd Wheeler, San Jose, CA (US); Robert W. Mayor, Half Moon Bay, CA (US); Brent M. Ledvina, San Francisco, CA (US); E Thomas Erdmann, IV, San Francisco, CA (US); Sriram Hariharan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/332,503

(22) Filed: Jun. 9, 2023

(65) Prior Publication Data

US 2023/0328515 A1 Oct. 12, 2023

Related U.S. Application Data

(63) Continuation of application No. 17/169,036, filed on Feb. 5, 2021, now Pat. No. 11,889,302.

(Continued)

(51) Int. Cl.
*H04W 12/04* (2021.01)
*H04L 9/08* (2006.01)
(Continued)

(52) U.S. Cl.
CPC .......... *H04W 12/04* (2013.01); *H04L 9/0891* (2013.01); *H04L 12/189* (2013.01);
(Continued)

(58) Field of Classification Search
CPC ..... H04W 12/04; H04W 12/03; H04W 76/10; H04W 12/61; H04W 12/63; H04W 8/005;
(Continued)

(56) References Cited

U.S. PATENT DOCUMENTS

| | | | |
|---|---|---|---|
| 4,918,425 A | 4/1990 | Greenberg et al. |
| 5,910,776 A | 6/1999 | Black |

(Continued)

FOREIGN PATENT DOCUMENTS

| | | |
|---|---|---|
| CN | 101682508 | 3/2010 |
| CN | 102325324 A | 1/2012 |

(Continued)

OTHER PUBLICATIONS

Lopez, Mareo, "The Importance of a Speaker's Resonant Frequency", proaudioland.com, 3 pages, Aug. 2015 (Year: 2015).

(Continued)

*Primary Examiner* — Bryan F Wright
(74) *Attorney, Agent, or Firm* — Aikin & Gallant, LLP

(57) ABSTRACT

The presence of a wireless device and/or accessory that cannot maintain an independent network connection can be detected by network connected wireless devices and the location of the detected device and/or accessory can be reported to a device location service. As the wireless devices and/or accessories do not have independent network connections, periodic maintenance is performed on those devices by nearby owner devices to which the wireless devices and/or accessories are paired or associated. Described herein are systems, methods, and associated devices to maintain a locatable wireless device by a set of multiple owner devices for that wireless device.

19 Claims, 15 Drawing Sheets

Related U.S. Application Data

(60) Provisional application No. 63/071,988, filed on Aug. 28, 2020.

(51) Int. Cl.

| | | |
|---|---|---|
| *H04L 9/40* | (2022.01) | |
| *H04L 12/18* | (2006.01) | |
| *H04W 12/03* | (2021.01) | |
| *H04W 76/10* | (2018.01) | |

(52) U.S. Cl.
CPC .......... *H04L 63/068* (2013.01); *H04W 12/03* (2021.01); *H04W 76/10* (2018.02)

(58) Field of Classification Search
CPC . H04W 12/041; H04W 12/126; H04W 12/75; H04L 9/0891; H04L 12/189; H04L 63/068; H04L 63/0442
USPC ........................................................ 380/273
See application file for complete search history.

(56) References Cited

U.S. PATENT DOCUMENTS

| | | |
|---|---|---|
| 6,292,660 B1 | 9/2001 | Hartless et al. |
| 6,345,098 B1 | 2/2002 | Matyas, Jr et al. |
| 6,369,706 B1 | 4/2002 | Anderson et al. |
| 6,754,349 B1 | 6/2004 | Arthan |
| 6,993,350 B2 | 1/2006 | Katoh |
| 7,039,427 B2 | 5/2006 | Tachikawa |
| 7,059,182 B1 | 6/2006 | Ragner |
| 7,274,761 B2 | 9/2007 | Muller et al. |
| 7,342,497 B2 | 3/2008 | Chung et al. |
| 7,376,393 B2 | 5/2008 | Ono et al. |
| 7,388,491 B2 | 6/2008 | Chand et al. |
| 7,519,377 B2 | 4/2009 | Tsukamoto |
| 7,558,529 B2 | 7/2009 | Seshadri et al. |
| 7,657,248 B2 | 2/2010 | Hodoshima |
| 8,213,389 B2 | 7/2012 | Bush et al. |
| 8,457,617 B2 | 6/2013 | Sweeney et al. |
| 8,538,401 B2 | 9/2013 | Kim et al. |
| 8,583,915 B1 | 11/2013 | Huang |
| 8,873,758 B2 | 10/2014 | Bradley |
| 8,971,924 B2 | 3/2015 | Pai et al. |
| 9,077,521 B2 | 7/2015 | Machani |
| 9,104,896 B2 | 8/2015 | Pai et al. |
| 9,277,353 B2 | 3/2016 | Merriam |
| 9,277,386 B1 | 3/2016 | Masiero et al. |
| 9,316,717 B2 | 4/2016 | Gicklhorn et al. |
| 9,323,916 B1 | 4/2016 | Wu et al. |
| 9,357,348 B2 | 5/2016 | Evans et al. |
| 9,420,423 B1 | 8/2016 | Mendelson |
| 9,426,749 B2 | 8/2016 | Cordeiro et al. |
| 9,432,802 B2 | 8/2016 | Matsushita et al. |
| 9,456,298 B2 | 9/2016 | Lee et al. |
| 9,462,109 B2 | 10/2016 | Frazier Fields et al. |
| 9,516,620 B1 | 12/2016 | Upp et al. |
| 9,520,045 B2 | 12/2016 | Hawkins |
| 9,544,075 B2 | 1/2017 | Altman et al. |
| 9,557,185 B2 | 1/2017 | Kimes |
| 9,565,255 B2 | 2/2017 | Kapoor et al. |
| 9,641,622 B2 | 5/2017 | Kapoor et al. |
| 9,706,032 B2 | 7/2017 | Pai et al. |
| 9,762,316 B2 | 9/2017 | Kukuiski et al. |
| 9,769,601 B2 | 9/2017 | Zelinka |
| 9,779,596 B2 | 10/2017 | Ingrassia et al. |
| 9,781,106 B1 | 10/2017 | Vitus et al. |
| 9,801,059 B2 | 10/2017 | Ziv et al. |
| 9,820,093 B2 | 11/2017 | Mayor et al. |
| 9,848,075 B1 | 12/2017 | Ahmad et al. |
| 9,860,932 B2 | 1/2018 | Kapoor et al. |
| 9,922,531 B1 | 3/2018 | Doxey et al. |
| 10,015,836 B2 | 7/2018 | Kapoor et al. |
| 10,022,066 B2 | 7/2018 | Tomiha |
| 10,022,086 B1 | 7/2018 | Kahn et al. |
| 10,042,595 B2 | 8/2018 | Behzadi et al. |
| 10,110,642 B2 | 10/2018 | Numakami |
| 10,366,692 B1 | 7/2019 | Adams et al. |
| 10,368,378 B2 | 7/2019 | Foster et al. |
| 10,410,485 B2 | 9/2019 | Ingrassia et al. |
| 10,448,211 B1 | 10/2019 | Shen et al. |
| 10,506,517 B2 | 12/2019 | Dai Javad et al. |
| 10,600,310 B2 | 3/2020 | Hawkins |
| 10,667,313 B2 | 5/2020 | Maguire et al. |
| 10,701,203 B2 | 6/2020 | Fiorini et al. |
| 10,771,898 B2 | 9/2020 | Dusan et al. |
| 10,841,736 B1 | 11/2020 | De La Broise |
| 10,855,483 B1 | 12/2020 | Ramesh et al. |
| 10,862,684 B2 | 12/2020 | Hong et al. |
| 10,956,975 B1 | 3/2021 | Abdul Gaffar et al. |
| 10,970,989 B1 | 4/2021 | Quibelan et al. |
| 10,992,755 B1 | 4/2021 | Tran |
| 11,051,105 B2 | 6/2021 | Dusan et al. |
| 11,088,830 B2 | 8/2021 | Gu et al. |
| 11,265,716 B2 | 3/2022 | Klinkner et al. |
| 11,282,351 B2 | 3/2022 | Ingrassia, Jr. et al. |
| 11,310,652 B2 | 4/2022 | Norp et al. |
| 11,595,784 B2 | 2/2023 | Mohalik |
| 11,606,669 B2 | 3/2023 | Lopatin et al. |
| 11,641,563 B2 | 5/2023 | Lopatin et al. |
| 11,863,671 B1 | 1/2024 | Sierra et al. |
| 11,889,302 B2 | 1/2024 | Victa et al. |
| 2002/0144215 A1 | 10/2002 | Hoskote et al. |
| 2003/0065918 A1 | 4/2003 | Willey |
| 2003/0092437 A1 | 5/2003 | Nowlin et al. |
| 2003/0182584 A1 | 9/2003 | Banes et al. |
| 2004/0249817 A1 | 12/2004 | Liu et al. |
| 2005/0021767 A1 | 1/2005 | Cai |
| 2005/0154896 A1 | 7/2005 | Widman et al. |
| 2005/0190098 A1 | 9/2005 | Bridgelall et al. |
| 2005/0285739 A1 | 12/2005 | Velhal et al. |
| 2006/0039337 A1 | 2/2006 | Hodoshima |
| 2006/0111835 A1 | 5/2006 | Baker et al. |
| 2007/0139199 A1 | 6/2007 | Hanlon |
| 2007/0249374 A1 | 10/2007 | Hu et al. |
| 2007/0283151 A1 | 12/2007 | Nakano et al. |
| 2007/0283395 A1 | 12/2007 | Wezowski |
| 2008/0004798 A1 | 3/2008 | Troxler et al. |
| 2008/0119953 A1 | 5/2008 | Reed et al. |
| 2008/0120196 A1 | 5/2008 | Reed et al. |
| 2009/0058670 A1 | 3/2009 | Sweeney et al. |
| 2009/0150674 A1 | 6/2009 | Richardson et al. |
| 2009/0315767 A1 | 12/2009 | Scalisi et al. |
| 2009/0323972 A1 | 12/2009 | Kohno et al. |
| 2009/0325599 A1 | 12/2009 | Vuori |
| 2010/0079249 A1 | 4/2010 | Pan |
| 2010/0159833 A1 | 6/2010 | Lewis et al. |
| 2010/0184378 A1 | 7/2010 | Wakefield |
| 2010/0245054 A1 | 9/2010 | Kim |
| 2010/0289620 A1 | 11/2010 | Aminger et al. |
| 2011/0124326 A1 | 5/2011 | Kudo |
| 2012/0054493 A1 | 3/2012 | Bradley |
| 2012/0083209 A1 | 4/2012 | Giles et al. |
| 2012/0275361 A1 | 11/2012 | Berenberg et al. |
| 2012/0310391 A1 | 12/2012 | Sanders |
| 2012/0311643 A1* | 12/2012 | Aguirre .................. H04N 7/20 725/72 |
| 2012/0328061 A1 | 12/2012 | Chow |
| 2013/0023238 A1 | 1/2013 | Kaplan et al. |
| 2013/0111555 A1 | 5/2013 | Leneel |
| 2013/0171986 A1 | 7/2013 | Shimizu |
| 2013/0271902 A1 | 10/2013 | Lai et al. |
| 2013/0275873 A1 | 10/2013 | Shaw et al. |
| 2013/0290191 A1 | 10/2013 | Dischamp et al. |
| 2013/0290522 A1 | 10/2013 | Behm, Jr. |
| 2013/0343542 A1 | 12/2013 | Rosati et al. |
| 2014/0111307 A1 | 4/2014 | Ingrassia et al. |
| 2014/0222685 A1 | 8/2014 | Middleton et al. |
| 2014/0379584 A1 | 12/2014 | Ward |
| 2015/0019124 A1 | 1/2015 | Bandyopadhyay et al. |
| 2015/0072618 A1 | 3/2015 | Granbery |
| 2015/0189596 A1 | 7/2015 | Stephens |
| 2015/0277852 A1 | 10/2015 | Burgis |
| 2015/0289207 A1 | 10/2015 | Kubo et al. |

(56) References Cited

U.S. PATENT DOCUMENTS

| | | |
|---|---|---|
| 2015/0334569 A1 | 11/2015 | Rangarajan et al. |
| 2015/0350140 A1 | 12/2015 | Garcia et al. |
| 2015/0350820 A1 | 12/2015 | Son et al. |
| 2015/0356030 A1 | 12/2015 | Zahand et al. |
| 2015/0382140 A1 | 12/2015 | Cho et al. |
| 2016/0006577 A1 | 1/2016 | Logan |
| 2016/0037439 A1 | 2/2016 | Shamis et al. |
| 2016/0057625 A1 | 2/2016 | Andrada et al. |
| 2016/0069991 A1 | 3/2016 | Das et al. |
| 2016/0080591 A1* | 3/2016 | Asakura .............. H04W 4/80 358/1.15 |
| 2016/0087959 A1 | 3/2016 | Park |
| 2016/0088143 A1 | 3/2016 | Cohn et al. |
| 2016/0094947 A1 | 3/2016 | Shen et al. |
| 2016/0140335 A1 | 5/2016 | Proulx et al. |
| 2016/0017402 A1 | 6/2016 | Cavallaro et al. |
| 2016/0164973 A1 | 6/2016 | Kapoor et al. |
| 2016/0174023 A1 | 6/2016 | Cavallaro et al. |
| 2016/0180392 A1 | 6/2016 | Liu et al. |
| 2016/0189507 A1 | 6/2016 | Rayner |
| 2016/0205556 A1 | 7/2016 | Borghei |
| 2016/0212538 A1 | 7/2016 | Fullam et al. |
| 2016/0234213 A1 | 8/2016 | Kim et al. |
| 2016/0242192 A1 | 8/2016 | Llosa et al. |
| 2016/0248564 A1 | 8/2016 | Qi et al. |
| 2016/0302137 A1 | 10/2016 | Escott et al. |
| 2016/0330095 A1 | 11/2016 | Numakami |
| 2016/0344712 A1 | 11/2016 | Ding et al. |
| 2016/0352518 A1 | 12/2016 | Ford et al. |
| 2016/0357385 A1 | 12/2016 | Dan et al. |
| 2016/0360350 A1 | 12/2016 | Watson et al. |
| 2016/0371507 A1 | 12/2016 | Jakobsson |
| 2017/0126818 A1 | 5/2017 | Kang |
| 2017/0127340 A1 | 5/2017 | Dooey et al. |
| 2017/0171181 A1 | 6/2017 | Britt |
| 2017/0228935 A1 | 8/2017 | Foster et al. |
| 2017/0272415 A1 | 9/2017 | Zhao et al. |
| 2017/0134898 A1 | 11/2017 | Vega et al. |
| 2017/0330031 A1 | 11/2017 | Wilson et al. |
| 2018/0013815 A1 | 1/2018 | Gold |
| 2018/0025595 A1 | 1/2018 | Ingrassia et al. |
| 2018/0035374 A1 | 2/2018 | Borden et al. |
| 2018/0176748 A1 | 6/2018 | Kim et al. |
| 2018/0183591 A1 | 6/2018 | De Laat et al. |
| 2018/0183596 A1 | 6/2018 | Deshpande et al. |
| 2018/0184286 A1 | 6/2018 | Patterson |
| 2018/0199138 A1 | 7/2018 | Dusan et al. |
| 2018/0219872 A1 | 8/2018 | Sugashima et al. |
| 2018/0227284 A1 | 8/2018 | Sugano et al. |
| 2018/0262907 A1 | 9/2018 | Alanis et al. |
| 2018/0288208 A1 | 10/2018 | Lee et al. |
| 2018/0317266 A1 | 11/2018 | Britt et al. |
| 2018/0343561 A1 | 11/2018 | Patterson |
| 2018/0348718 A1 | 12/2018 | Richardson et al. |
| 2019/0028281 A1 | 1/2019 | Turissini et al. |
| 2019/0028445 A1 | 1/2019 | McLaughlin et al. |
| 2019/0034920 A1 | 1/2019 | Nolan et al. |
| 2019/0037469 A1 | 1/2019 | Krishnan et al. |
| 2019/0058966 A1 | 2/2019 | Puppala et al. |
| 2019/0069243 A1 | 2/2019 | Bean et al. |
| 2019/0116173 A1 | 4/2019 | Robison et al. |
| 2019/0191301 A1 | 6/2019 | Fang et al. |
| 2019/0213528 A1 | 7/2019 | Gupta et al. |
| 2019/0246253 A1 | 8/2019 | Ryu et al. |
| 2019/0289059 A1 | 9/2019 | Vanahalli et al. |
| 2020/0034835 A1 | 1/2020 | Kim |
| 2020/0074822 A1 | 3/2020 | Ingrassia, Jr. et al. |
| 2020/0107164 A1 | 4/2020 | Lopatin et al. |
| 2020/0145244 A1 | 5/2020 | Hollinger et al. |
| 2020/0177595 A1 | 6/2020 | Rakshit et al. |
| 2020/0187001 A1 | 6/2020 | Ard et al. |
| 2020/0226908 A1 | 7/2020 | Doxey et al. |
| 2020/0242662 A1 | 7/2020 | Middleton et al. |
| 2020/0344549 A1 | 10/2020 | Wegener |
| 2021/0044957 A1 | 2/2021 | Norp et al. |
| 2021/0136846 A1 | 5/2021 | Ponnusamy et al. |
| 2021/0203747 A1 | 7/2021 | Gorsica, IV et al. |
| 2021/0204115 A1 | 7/2021 | Gorsica, IV et al. |
| 2021/0250355 A1 | 8/2021 | Galdo et al. |
| 2021/0256833 A1 | 8/2021 | Daouta et al. |
| 2021/0334851 A1 | 10/2021 | Proctor, Jr. et al. |
| 2021/0400045 A1 | 12/2021 | Kondeti |
| 2022/0052847 A1 | 2/2022 | Gonzalez Cervantes et al. |
| 2022/0070667 A1 | 3/2022 | Victa et al. |
| 2022/0078029 A1 | 3/2022 | Galdo et al. |
| 2022/0200789 A1 | 6/2022 | Lalande et al. |
| 2022/0224300 A1 | 7/2022 | Knode |
| 2022/0256633 A1 | 8/2022 | Gu et al. |
| 2022/0327196 A1 | 10/2022 | Trapani |
| 2022/0369022 A1 | 11/2022 | Jorgovanovic et al. |
| 2022/0386076 A1 | 12/2022 | Lopatin et al. |
| 2022/0394431 A1 | 12/2022 | Lopatin et al. |

FOREIGN PATENT DOCUMENTS

| | | |
|---|---|---|
| CN | 104833945 | 8/2015 |
| CN | 106412816 | 2/2017 |
| CN | 106792501 A | 5/2017 |
| CN | 107328424 | 11/2017 |
| CN | 108223229 A | 6/2018 |
| CN | 108520552 | 9/2018 |
| CN | 109596118 | 4/2019 |
| CN | 111436040 | 7/2020 |
| CN | 112068512 | 12/2020 |
| CN | 114071357 | 2/2022 |
| EP | 1296155 | 3/2003 |
| EP | 2020784 | 2/2009 |
| GB | 2472192 A | 2/2011 |
| JP | 2018191522 | 12/2018 |
| JP | 2021025798 | 2/2021 |
| KR | 20140044916 | 4/2014 |
| KR | 20170013833 | 2/2017 |
| KR | 20180086118 | 7/2018 |
| KR | 2019-0141998 A | 12/2019 |
| WO | 2010126846 | 11/2010 |
| WO | 2012030733 | 3/2012 |
| WO | 2013036488 | 3/2013 |
| WO | 2013163334 | 10/2013 |
| WO | 2014005004 | 3/2014 |
| WO | 2014042507 A1 | 3/2014 |
| WO | 2016032610 | 3/2016 |
| WO | 2016036453 A1 | 3/2016 |
| WO | 2017107077 | 6/2017 |
| WO | 2018001518 A1 | 1/2018 |
| WO | 2018118026 A1 | 6/2018 |
| WO | 2018135919 | 7/2018 |
| WO | 2018156555 | 8/2018 |
| WO | 2018160863 A1 | 9/2018 |
| WO | 2019232420 A2 | 12/2019 |
| WO | 2020214701 A1 | 10/2020 |
| WO | 2020214708 A1 | 10/2020 |
| WO | 2020214709 A1 | 10/2020 |
| WO | 2020214711 A1 | 10/2020 |
| WO | 2022046527 | 3/2022 |
| WO | 2022256438 | 12/2022 |

OTHER PUBLICATIONS

Thetileapp.com [online], "Learn How Tile's Tracking Device Helps You Find Your Lost Things," Dec. 9, 2016, retrieved from URL <https://www.thetileapp.com/how-it-works>, 9 pages.

PCT/US2023/017975, "PCT Notification of Transmittal of the International Search Report and the Written Opinion of the International Searching Authority, or the Declaration", mailed Jun. 29, 2023, 12 pages.

PCT/US2019/048899, "Notification of Transmittal of the International Search Report and the Written Opinion of the International Searching Authority, or the Declaration" mailed Dec. 2, 2019, 5 pgs.

A. Korolova et al., "Cross-App Tracking via Nearby Bluetooth Low Energy Devices", A presentation proposal for PrivacyCon 2017, Published Mar. 13, 2018, 12 pgs.

(56) References Cited

OTHER PUBLICATIONS

PCT/US2020/028318, "PCT Notification of Transmittal of the International Search Report and the Written Opinion of the International Searching Authority, or the Declaration", Mailed Jul. 8, 2020, 16 pages.
PCT/US2020/028326, "PCT Notification of Transmittal of the International Search Report and the Written Opinion of the International Searching Authority, or the Declaration", Mailed Jul. 3, 2020, 12 pages.
PCT/US2020/028327, "PCT Notification of Transmittal of the International Search Report and the Written Opinion of the International Searching Authority, or the Declaration", Mailed Sep. 14, 2020, 17 pages.
PCT/US2020/028329, "PCT Notification of Transmittal of the International Search Report and the Written Opinion of the International Searching Authority, or the Declaration", Mailed Jul. 15, 2020, 13 pages.
Mannan, Mohammad, et al. "Mercury: Recovering forgotten passwords using personal devices." International Conference on Financial Cryptography and Data Security. Springer, Berlin, Heidelberg, 2011 (Year: 2011).
FOFA, "Find One, Find All Key Finder & Remote Control Locators", received from The Wayback Machine—https://web.archive.org/web/20200715080402/http://www.findonefindall.com:80/index.htm, 3 pages.
Kim et al., "In/Out Status Monitoring in Mobile Asset Tracking with Wireless Sensor Networks", received from www.mdpi.com/journal/sensors, published Mar. 26, 2010, 22 pages.
Fuemmeler et al., "Energy Efficient Multi-Object Tracking in Sensor Networks", received from https://ieeexplore.ieee.org/document/5439914, published Mar. 29, 2010, 9 pages.
Cocchi et al., "Subband Neural Networks Prediction for On-Line Audio Signal Recovery", received from https://ieeexplore.ieee.org/document/1021887, Published Jul. 2002, 10 pages.
PCT/US2022/027681, "PCT Notification of transmittal of the International Search Report and the Written Opinion of the International Searching Authority, or the Declaration", mailed Jul. 28, 2022, 9 pages.
EP22172663.1, "Extended European Search Report" mailed Jan. 25, 2023, 18 pages.

\* cited by examiner

MAINTENANCE OF WIRELESS DEVICES BY ELECTRONIC DEVICES

CROSS-REFERENCE

This application is a continuation of co-pending U.S. patent application Ser. No. 17/169,036, filed Feb. 5, 2021, which claims the benefit of U.S. Provisional Application No. 63/071,988, filed Aug. 28, 2020, each of which is incorporated herein by reference.

FIELD

Embodiments described herein relate generally to a system and method of locating wireless devices and accessories. More specifically, embodiments relate to periodic maintenance of wireless devices and accessories over a secure wireless connection.

BACKGROUND OF THE DESCRIPTION

Current security features in handheld and portable products allow the location of the product to be identified when requested by the user, such as in instances where the product is lost or stolen. If the wireless device includes positioning technology, the device can be configured to report its last location to the server computer, which is displayed by the service on a map presented to the user. Often wireless devices are used with wireless accessory devices that cannot determine their location and cannot communicate with a remote tracking services over a wide area network. These accessory devices can include, for example, wireless earbuds, headphones, headsets and other wearable devices (e.g., smartwatches, fitness bands, optical head-mounted displays) that communicate directly with the wireless device using peer-to-peer communications. For wireless accessory devices that cannot determine their location and cannot communicate with the remote tracking service, those devices cannot be tracked by the service when lost or stolen. However, the presence of those devices can be detected based on wireless signals broadcast by those devices.

SUMMARY OF THE DESCRIPTION

Embodiments described herein provide a technique to arbitrate the maintenance of a wireless accessory between multiple owner devices. The presence of a wireless device and/or accessory that cannot maintain an independent network connection can be detected by network connected wireless devices and the location of the detected device and/or accessory can be reported to a device location service. As the wireless devices and/or accessories do not have independent network connections, periodic maintenance is performed on those devices by nearby owner devices to which the wireless devices and/or accessories are paired or associated. Without an arbitration mechanism, various owner devices may continually attempt to perform maintenance operations on nearby wireless accessories. Described herein are systems, methods, and associated devices to maintain a locatable wireless device by a set of multiple owner devices for that wireless device.

One embodiment provides as method performed on a wireless device. The method comprises establishing a first encrypted wireless connection with a first electronic device, where the first encrypted wireless connection is established using cryptographic material associated with a first key rotation period. The method additionally includes setting an indicator in a status field of a first wireless advertisement packet type. The first wireless advertisement packet type is associated with a first broadcast mode and the indicator indicates that the wireless device has been maintained during the first key rotation period. The method on the wireless device additionally includes broadcasting a wireless beacon having the first advertisement packet type and, in response to disconnecting from the encrypted wireless connection, starting a counter associated with a timeout period. The timeout triggers the wireless device to transition to a second broadcast mode. The wireless device will periodically transition rotate to a new cryptographic key for use in establishing encrypted connections with the device. During a transition from the first key rotation period to a second key rotation period, the wireless device can reset the indicator in the status field of the first wireless advertisement packet type. In response to establishing a second encrypted wireless connection with a second electronic device, the electronic device can reset the counter associated with the timeout period.

One embodiment provides a data processing system on a wireless device comprising a memory device and one or more processors to execute instructions stored in the memory device, wherein the instructions cause the one or more processors to perform operations to establish a first encrypted wireless connection with a first electronic device and in response to establishment of the first encrypted wireless connection: set an indicator in a status field of a first wireless advertisement packet type, wherein the indicator indicates that a maintenance operation has been performed on the wireless device during a first key rotation period and broadcast a wireless beacon having the first wireless advertisement packet type. In response to disconnection from the first encrypted wireless connection, the data processing system can start a counter associated with a timeout period. Expiration of the timeout period can trigger the wireless device to transition from a first broadcast mode to a second broadcast mode. The data processing system can then establish a second encrypted wireless connection with a second electronic device. The second electronic device can be associated with an account shared with the first electronic device. The data processing system can then reset the counter associated with the timeout period after the second encrypted wireless connection is established.

One embodiment provides a non-transitory machine-readable medium storing instructions to cause one or more processors of a wireless device to perform operations comprising establishing a first encrypted wireless connection with a first electronic device, where the first encrypted wireless connection is established using cryptographic material associated with a first key rotation period. The operations additionally include setting an indicator in a status field of a first wireless advertisement packet type. The first wireless advertisement packet type is associated with a first broadcast mode and the indicator indicates that the wireless device has been maintained during the first key rotation period. The operations additionally broadcasting a wireless beacon having the first advertisement packet type and, in response to disconnecting from the encrypted wireless connection, starting a counter associated with a timeout period. The timeout triggers the wireless device to transition to a second broadcast mode. The wireless device will periodically transition rotate to a new cryptographic key for use in establishing encrypted connections with the device. During a transition from the first key rotation period to a second key rotation period, the wireless device can reset the indicator in the status field of the first wireless advertisement packet type. In response to establishing a second encrypted wireless connection with a second electronic device, the electronic device can reset the counter associated with the timeout period.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments described herein provide techniques to enable secure crowdsourced locator services for lost or misplaced devices that cannot communicate with a wide area network. Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

The terminology used in this description is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the discussion that follows, a computing device that includes a touch-sensitive display is described. It should be understood, however, that the computing device may include one or more other physical user-interface devices. The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

Some processes are described below in terms of some sequential operations. However, it should be appreciated that some of the operations described may be performed in a different order. Moreover, some operations may be performed in parallel rather than sequentially.

Operating Environment Overview

Figure 1:
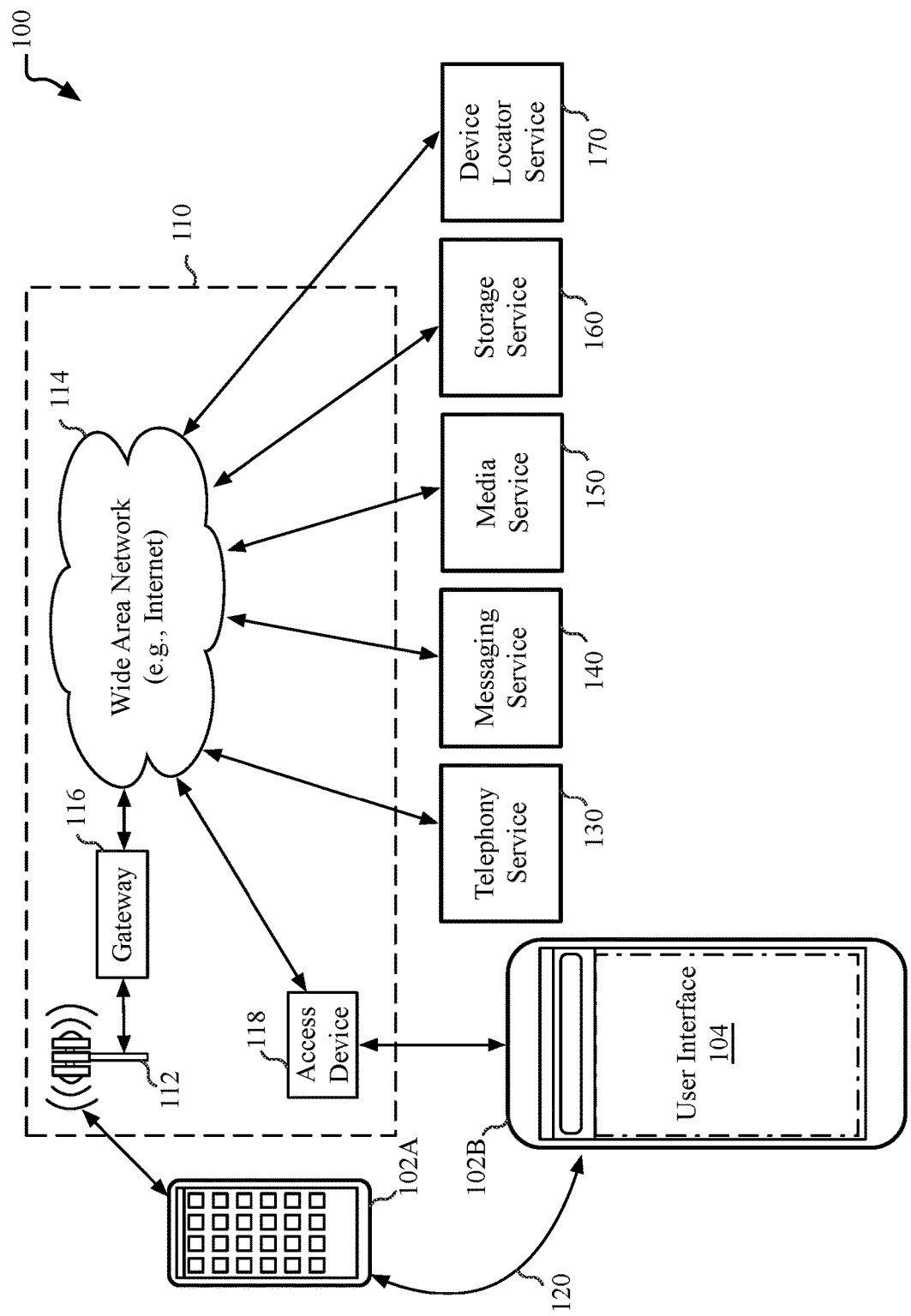
FIG. 1 is a block diagram of a network operating environment for mobile devices, according to an embodiment.

FIG. 1 is a block diagram of a network operating environment 100 for mobile devices, according to an embodiment. The network operating environment 100 includes multiple mobile devices, such as mobile device 102A and mobile device 102B. The mobile devices 102A-102B can each be any electronic device capable of communicating with a wireless network and one or more wireless accessory devices. Some example mobile devices include but are not limited to a smartphone, a tablet computer, a notebook or laptop computer, a wearable computer (e.g., smartwatch or other wearable computing accessory), a mobile media player, a personal digital assistant, and other similar devices. Each of mobile device 102A and mobile device 102B include a user interface, such as user interface 104 of mobile device 102B. Mobile device 102A and mobile device 102B can communicate over one or more wired and/or wireless networks 110 to perform data communication. For example, a wireless network 112 (e.g., cellular network, Wi-Fi network) can communicate with a wide area network 114, such as the Internet, by use of a gateway 116. Likewise, an access device 118, such as a mobile hotspot wireless access device, can provide communication access to the wide area network 114. The gateway 116 and access device 118 can then communicate with the wide area network 114 over a combination of wired and/or wireless networks.

In some implementations, both voice and data communications can be established over the wireless network 112 and/or the access device 118. For example, mobile device 102A can place and receive phone calls (e.g., using VoIP protocols), send and receive e-mail messages (e.g., using POP3 protocol), and retrieve electronic documents and/or streams, such as web pages, photographs, and videos, over the wireless network 112, gateway 116, and wide area network 114 (e.g., using TCP/IP or UDP protocols). In some implementations, mobile device 102A can place and receive phone calls, send and receive e-mail messages, and retrieve electronic documents over the access device 118 and the wide area network 114. In some implementations, mobile device 102A or mobile device 102B can be physically connected to the access device 118 using one or more cables, for example, where the access device 118 is a personal computer. In this configuration, mobile device 102A or mobile device 102B can be referred to as a "tethered" device. In one embodiment, mobile device 102A can communicate with mobile device 102B via a wireless peer-to-peer connection 120. The wireless peer-to-peer connection 120 can be used to synchronize data between the devices.

Mobile device 102A or mobile device 102B can communicate with one or more services, such as a telephony service 130, a messaging service 140, a media service 150, a storage service 160, and a device locator service 170 over the one or more wired and/or wireless networks 110. For example, the telephony service 130 can enable telephonic communication between mobile device 102A and mobile device 102B, or between a mobile device and a wired telephonic device. The telephony service 130 can route voice over IP (VoIP) calls over the wide area network 114 or can access a cellular voice network (e.g., wireless network 112). The messaging service 140 can, for example, provide e-mail and/or other messaging services. The media service 150 can, for example, provide access to media files, such as song files, audio books, movie files, video clips, and other media data. The storage service 160 can provide network storage capabilities to mobile device 102A and mobile device 102B to store documents and media files. The device locator service 170 can enable a user to locate a lost or misplaced device that was, at least at some point, connected to the one or more wired and/or wireless networks 110. For example, mobile device 102A can perform a location query for mobile device 102B. The device locator service 170 can also enable location queries for devices that do not have a network connection via the use of a network of finder devices, as shown below in FIG. 2-3. Other services can also be provided, including a software update service to update operating system software or client software on the mobile devices. In one embodiment, the messaging service 140, media service 150, storage service 160, and device locator service 170 can each be associated with a cloud service provider. The various services can then be facilitated via a cloud services account associated with the mobile devices 102A-102B. In one embodiment, the storage server 160 can be used to synchronize cryptographic material that is used to connect to or identify accessories that are shared between the mobile devices 102A-102B.

Figure 2:
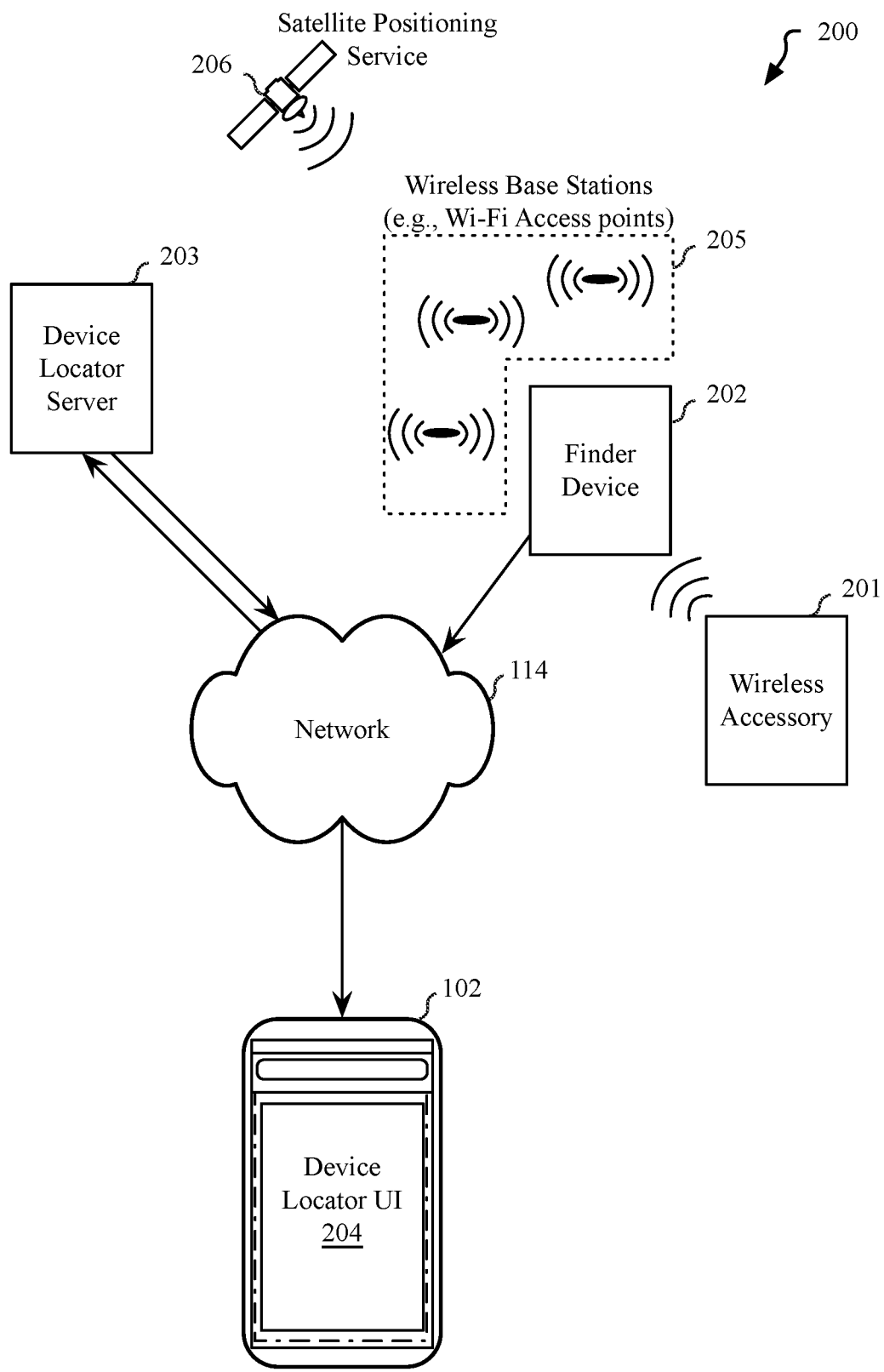
FIG. 2 illustrates a system to locate a wireless accessory that lacks access to a wide area network, according to an embodiment.

FIG. 2 illustrates a system 200 to locate a wireless accessory 201 that lacks access to a wide area network, according to an embodiment. The system 200 can also be used to locate a device that is unable to access a WAN or LAN, and thus cannot transmit the device location. In one embodiment, the wireless accessory 201 includes one or more wireless transceivers and can communicate, either directly or indirectly (e.g., through another device or computer) with a companion device over a wireless network or peer-to-peer communication link. A companion device is an electronic device (e.g., mobile device 102) to which the wireless accessory 201 is paired or cryptographically associated. Some examples of wireless accessory devices include but are not limited to wireless earbuds, headphones, headsets and other wearable devices (e.g., smartwatches, fitness bands, optical head-mounted displays). The wireless accessory 201 can also include other wireless devices such as game controllers or remote controls. The wireless accessory 201, in one embodiment, also includes smartphones, tablet computers, laptop computers, smart speaker devices, televisions, or television set top boxes that at least temporarily are unable to access a wide area network, such as the Internet (e.g., wide area network 114 as in FIG. 1). The wireless accessory can also be any other wireless device, including wireless beacon peripherals or locator tags that can be attached to other devices or items to enable the tracking or locating of those devices or items. In one embodiment, the wireless accessory 201 can be paired with the mobile device 102 using a wireless technology standard, such as but not limited to Bluetooth. The wireless accessory 201 can also communicate with the mobile device 102 over wireless technologies such as Wi-Fi direct, Zigbee, or AirPlay. While the companion device to which the wireless accessory 201 is paired is generally referred to as a mobile device 102, companion devices are not limited to mobile devices. Companion devices, in some embodiments, can also include laptop or desktop devices and can additionally include some wearable accessories, such as but not limited to a smart watch device or a wearable display.

In one embodiment, the wireless accessory 201 can periodically transmit a wireless beacon signal. The wireless accessory 201 can transmit the beacon signal using one of a variety of wireless technologies (e.g., Bluetooth, Wi-Fi, Z-wave, Zigbee, etc.) and in one embodiment can also beacon using an ultra-wide band (UWB) radio technology. The beacon signal can be transmitted using a single wireless technology, one of multiple selectable wireless technologies, or multiple simultaneous wireless technologies. The beacon signal can transmit a beacon identifier that includes information to specifically identify the wireless accessory 201. In one embodiment, the beacon identifier is a public encryption key associated with the device.

The beacon signal can also convey information about the wireless accessory 201, such as a beacon type, device classification, battery level. In one embodiment the beacon signal can also convey device status, such as a lost status, alarm status, or a near owner status. The beacon signal can also include information that specifies battery life, charging status, and/or other status information. The lost status can indicate that the wireless accessory 201 has determined itself to be lost or has been placed into a lost state by the owner of the device. The alarm status can indicate that the wireless accessory 201 was placed in a state that the device should trigger an alarm if moved from a current location. The near owner status can indicate that the wireless accessory 201 has detected the nearby presence of the mobile device 102 associated with the owner of the accessory.

The beacon signal can be detected by a finder device 202, which is locally proximate to the wireless accessory 201. The finder device 202 can be a similar device as the mobile device 102 and can receive and transmitting data over a wide area network 114 and receiving and transmitting using similar wireless technologies as the wireless accessory 201 (e.g., Bluetooth, etc.). Particularly, the finder device 202 can receive data using the wireless protocol over which the beacon signal is transmitted. The finder device 202 can determine a location using one or more location and/or positioning services including, but not limited to a satellite positioning service 206 or a terrestrial positioning system using RF signals received from wireless base stations 205 such as Wi-Fi access points or cell tower transmitters of a cellular telephone network. In an embodiment, the finder device 202 periodically stores its location as determined based on the one or more location and/or positioning services. The stored location can be associated with a timestamp for which the location was determined. When the finder device 202 receives a beacon signal from the wireless accessory 201, the finder device 202 can transmit a location for the finder device over the wide area network 114 to a device locator server 203. The timestamp for a determined location for the finder device 202 can be correlated with a timestamp for which a beacon signal was received to associate a geographic location with a received beacon signal. In one embodiment, the wireless accessory 201 includes location determination capability via an integrated satellite positioning service (e.g., GPS) receiver. If the wireless accessory lacks access to a network to send a location to the device locator server 203, the wireless accessory can encode encrypted location data within the beacon signal 301. Finder device 202 can then relay the encrypted location data to the device locator server 203.

Where the wireless accessory 201 provides a public key within the beacon signal, the finder device 202 can encrypt the determined location data and transmit the encrypted location data to the device locator server 203 over the wide area network 114. In one embodiment, additional data can either be encrypted and transmitted along with the location data or transmitted unencrypted to the device locator server 203. For example, a received signal strength indicator (RSSI) for the beacon signal can be transmitted along with the location data. The RSSI data can then be used to determine the distance of the wireless accessory 201 from the finder device 202 and assist in triangulation on the owner device. Where the RSSI data is transmitted in an unencrypted state, in one embodiment the server can use RSSI information to reduce noise by discarding very weak signals if other, stronger signals are present. In one embodiment, UWB ranging data can also be provided, where such data is available.

In one embodiment, the finder device 202 can behave differently upon receiving a beacon signal from a wireless accessory 201 depending upon a device status conveyed by the wireless accessory 201. For standard beacon signals, the finder device 202 can place encrypted location data into a queue and transmit the location data to the device locator server 203 during a periodic transmission window. However, if the wireless accessory 201 is indicating an alarm state, the finder device 202 can transmit the location data to the device locator server 203 immediately. Additionally, the finder device 202 may not transmit the location data to the device locator server 203 if the beacon signal of the wireless accessory 201 indicates that the accessory is near the owner of the accessory. Alternatively, the finder device 202 may delay transmission of encrypted location data. The device status can also indicate whether near owner maintenance has been performed on the wireless accessory 201. If an owner device (e.g., mobile device 102) detects that the wireless accessory is broadcasting a status bit that indicates that it has not been recently maintained, the owner device can connect to the wireless accessory 201 and perform maintenance operations such as synchronizing timers, setting or resetting internal counters, checking for error or crash logs, or other operations that are periodically performed on the wireless accessory 201.

If the owner of the wireless accessory 201 wishes to locate the wireless accessory, the owner can access a device locator user interface (e.g., device locator UI 204) on the mobile device 102. The device locator UI 204 can be associated with a device locator application that is used to locate electronic devices and accessories that are registered with an online account of the user, such as a cloud services account or another type of online account. The device owner, using the device locator UI 204, can query the device locator server 203 for location data that may have been transmitted to the device locator server by a finder device 202 of the wireless accessory 201. In one embodiment, the mobile device 102 can transmit the public encryption key associated with the wireless accessory 201 to the device locator server 203. The device locator server 203 can then return any stored location data that corresponds with the public encryption key. The location data returned to the mobile device 102 can be encrypted data that is encrypted by the finder device 202 using the public encryption key. The mobile device 102 can use an associated private key to decrypt the encrypted location data. The decrypted location data can then be processed by the mobile device 102 to determine a most probable location for the wireless accessory 201. In various embodiments, the most probable location for the wireless accessory 201 can be determined by triangulation from multiple received locations and using other data, such as a beacon signal RSSI associated with each location and timestamp or UWB ranging data included within the location data.

Figure 3:
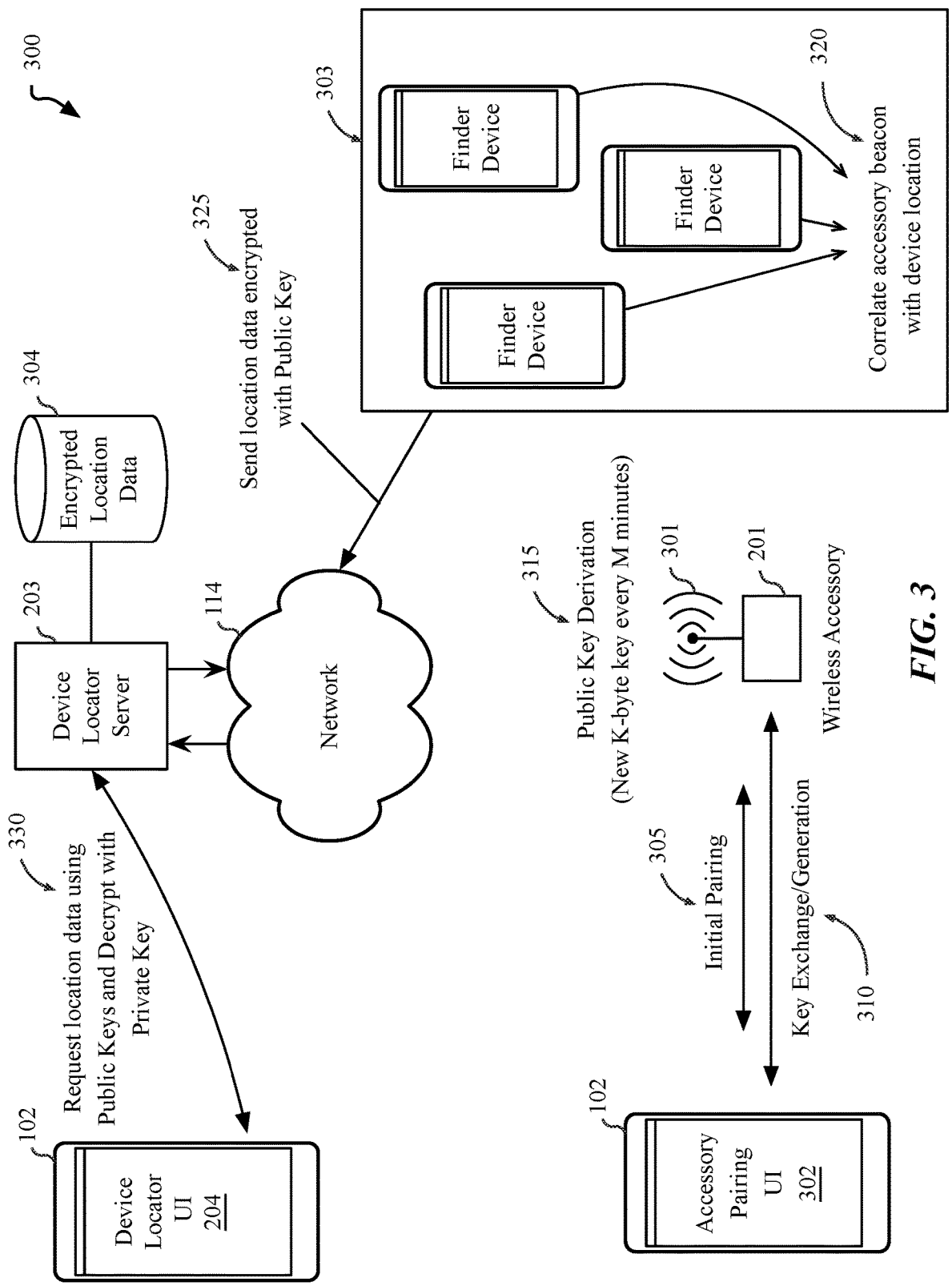
FIG. 3 illustrates a system for pairing and locating a wireless accessory, according to embodiments described herein.

FIG. 3 illustrates a system 300 for pairing and locating a wireless accessory, according to embodiments described herein. In one embodiment a mobile device 102 of a user of the wireless accessory 201 can present an accessory pairing UI 302 by which the user can pair the mobile device 102 with the wireless accessory 201. During an initial pairing (305) between the mobile device 102 and the wireless accessory, a public key exchange (310) can be performed between the mobile device 102 and the wireless accessory 201. In one embodiment the initial pairing 305 is performed over a secure wireless communication session that includes additional security over and beyond that which is provided by the wireless protocol. In one embodiment, during the public key exchange (310) the mobile device 102 and the wireless accessory 201 exchange public keys of public key pairs generated by the device and the accessory. In one embodiment the public key exchange (310) is a one-way transfer, in which the mobile device 102 transmits a public key of a public/private key pair to the wireless accessory 201. Alternatively, or additionally, the public key exchange (310) may be a Diffie-Hellman key exchange in which the device and the accessory establish a shared secret between two parties. In one embodiment, the public key exchange (310) additionally uses elliptic curve cryptography to establish the shared secret. For example, Elliptic-Curve Diffie-Hellman (ECDH) can be used to enable the establishment of a public key pair and one or more shared secrets. In one embodiment, the one or more shared secrets include an anti-tracking secret, which can be used by the wireless accessory 201 to periodically derive additional public keys. In one embodiment, the public key exchange (310) is performed as part of a collaborative key generation process in which that is performed by the mobile device 102 and the wireless accessory 201. In one embodiment, identity-based encryption is used at least in part. With identity-based encryption, the public key is, or is derived from, some unique element of information about the identity of the user, such as an e-mail address. The entity that is to decrypt the encrypted information can obtain the decryption key from a trusted central authority.

After the wireless accessory 201 has been paired with the mobile device 102, the wireless accessory 201 can periodically broadcast a beacon signal 301 that includes device status information and a beacon identifier. In one embodiment the beacon identifier is a public key derived from a shared secret that is established during the public key exchange (310). Additionally, the wireless accessory 201 can periodically perform a public key derivation (315) to generate a new public key and begin broadcasting the new public key as the beacon identifier. Alternatively, a large number of keys can be derived based on the public key and periodically rotated into use. The beacon identifier is a K-byte key, with a new K-byte key generated or rotated into use every M minutes. The value K and M can vary between embodiments. In one embodiment, a K value of 28 bytes is used. In one embodiment, a K value of 27 bytes is used. The value K can be determined at least in part based on the beacon length associated with the wireless protocol used to transmit the beacon signal 301. In one embodiment, the beacon signal can transmit a variant of beacon advertisement packet associated with a low-energy radio protocol, such as Bluetooth Low Energy.

The value M, in one embodiment, is 15 minutes, such that a new K-byte key is selected every 15 minutes. The new K-byte key can be pre-generated deterministically along with a batch of keys and selected during a key rotation period. Using different keys over time, prevents the long-term association with a specific key with a specific device. The key can be derived based on a shared secret known only to the mobile device 102 and the wireless accessory 201, allowing the mobile device 102 to determine which public key will be broadcast by the wireless accessory 201 at any given timestamp.

In one embodiment the wireless accessory 201 can transmit the beacon signal 301 every two seconds, although other beacon rates can be used, and the beacon rate can vary under certain circumstances. For example, the wireless accessory 201 can decrease a beacon rate when in a near owner state. Beacon rate can also vary based on accelerometer triggered events. For example, the wireless accessory 201 can increase the beacon rate when in an alarm state, which can be triggered by the accelerometer on the wireless accessory 201. The beacon rate may also increase when the wireless accessory 201 is in motion and decrease when wireless accessory 201 is stationary.

The wireless accessory 201 can enter an alarm state upon receiving a message from the mobile device 102 that indicates that the wireless accessory 201 should enter the alarm state. When in the alarm state, the wireless accessory can initially enter an armed state in which the wireless accessory 201 can reduce or cease the transmission of locator beacon signals, although other types of wireless signaling can persist. The wireless accessory 201 can remain in the armed state until the state is deactivated by the mobile device 102 or alarm is triggered. The alarm can be triggered, in one embodiment, upon detection of movement, for example, via an accelerometer within the wireless accessory 201. The alarm can also be triggered, in one embodiment, upon detection that the wireless accessory has moved out of range of the mobile device and is no longer in the near owner state. When the alarm is triggered, the rate at which the beacon signal 301 can be increased, to increase the speed by which the wireless accessory 201 can be located.

The beacon signal 301 transmitted by the wireless accessory 201 can be detected by a set of finder devices 303, which are other electronic devices that can receive the beacon signal transmitted by the wireless accessory and are transmit location and other data associated with the beacon signal 301 to the device locator server 203 via the wide area network 114. In one embodiment the set of finder devices 303 include variants of the mobile device 102 or can be other types of electronic devices. The set of finder devices 303 can include a variant of the finder device 202 of FIG. 2 and can determine similar location determination techniques. For example, the set of finder devices can perform operations (320) to correlate the beacon signal 301 received from the wireless accessory 201 with a device location associated with the finder device. As described with respect to FIG. 2, the device location can be determined via a satellite positioning service or a terrestrial positioning system that uses RF signals received from wireless base stations (e.g., Wi-Fi access points or cell tower transmitters). In one embodiment the set of finder devices 303 can also include stationary devices such as smart speaker devices, televisions, or television set top boxes that can receive the beacon signal 301.

The set of finder devices 303 can encrypt the location data with the beacon identifier (e.g., public key) received within the beacon signal 301 and send the location data (325) to the device locator server 203. The data sent by the set of finder devices 303 is sent anonymously and no identifying information for the finder devices is stored with the data sent by the finder devices.

The device locator server 203 can store encrypted location data in a data store 304, which in one embodiment can be a distributed database having multiple nodes. Hashes of the beacon identifier/public key of an accessory can be sent along with encrypted location data. The encrypted location data can be stored to a database node based on a hash of the beacon identifier. The encrypted location data can be indexed by the device locator server 203 using the hash of the beacon identifier. Sending the hash of the beacon identifier instead of the full beacon identifier prevents the storage of the full beacon identifier to the server. Other information can also be sent and stored with the location data, either in an encrypted or unencrypted state. The other information can include timestamps for when the beacon signal 301 was received, RSSI information for the received beacon, and/or ranging information determined, for example, via UWB ranging.

When the user or owner of the wireless accessory 201 wishes to locate the accessory, the user or owner can access the device locator UI 204 on the mobile device 102. The device locator UI 204 can be associated with a device locator application or feature of the mobile device 102. The device locator UI 204 may also have a web-based interface that can be accessed from the mobile device 102 or another type of electronic device, such as a laptop or desktop device. The mobile device 102, upon loading the device locator UI 204, can send a request (330) for location data to the device locator server 203. The request 330 can include a set of public key hashes, which can serve as beacon identifiers for the beacon data. The mobile device 102 can generate the set of public keys based on the secret information held by the mobile device 102 and the wireless accessory 201 and the timestamps over which the mobile device 102 wishes to receive location data. In one embodiment the set of public keys is based on the sequence of public keys $P_i$ that are generated based on the anti-tracking secret. The sequence of public keys $P_i$ corresponds to a matching sequence of private keys di. The mobile device 102 can generate the sequence of public keys, as well as the corresponding sequence of public keys di, where i is a counter or timestamp. In one embodiment, the mobile device 102 can generate and send hashes for the previous 24 hours of public keys within the request 330. If no data is found for 24 hours of public keys, the mobile device 102 can send hashed keys for an earlier period, back to a predetermined location data retention limit.

The encrypted location data is stored and indexed based on a hash of the public key instead of the public key to prevent the provider of the location service data from storing data that can be used to tie the encrypted location data to a specific device, and thus a specific user or user account. The finder device sends the hash of the public key that is broadcast within the beacon signal 301 associated with an observation location. The owner of the device can query the device locator server 203 using a hash of the public key that is determined for a query period.

In some embodiments, if a location query is to be performed via the web-based interface from an electronic device, such as a laptop or desktop device, keys to enable the decryption of the location data may be required to be sent to the electronic device. In one embodiment, decryption keys for the location data may be sent to the server that provides the web-based interface to enable the server to decrypt location data, at least while the location data is being viewed through the web-based interface. Before location data is displayed via the web-based interface, a notice may be presented to inform the user that location decryption keys are being temporarily shared with the web-based interface server to enable location data to be decrypted and presented. In one embodiment, the sharing of the location decryption keys can be performed via an automatic and temporarily delegation of location query rights with a proxy account associated with the web-based interface.

In one embodiment, the wireless accessory 201 can be placed in a light lost mode. In the light lost mode, a set of future public keys can be generated for the wireless accessory and hashes of those public keys can be transmitted to the device locator server 203. The device locator server 203 can then notify the mobile device 102 if any location data is received that correspond with a key in the set of future public keys. In one embodiment, a finder device that sends a location for a wireless accessory that is in the light lost mode can be directed by the device locator server 203 to relay a message to the wireless accessory 201 that notifies the wireless accessory that it is in the light lost mode. A similar mechanism can be used to relay a message to the wireless accessory 201 that places the accessory in an explicit lost mode. The explicit lost mode can be enabled by the user via the device locator UI 204. In the explicit lost mode, the wireless accessory 201 cannot be paired with another device unless unlocked by the owner.

Near Owner Maintenance

In one embodiment, to establish a secure session with the wireless accessory 201, the accessory is placed into a near-owner mode. During the secure session with an owner device, and for a period of time after disconnection from the secure session, the wireless accessory 201 will beacon in near owner mode. When the wireless accessory 201 has not connected with an owner device for over a threshold period of time, the wireless accessory 201 may broadcast in a wild mode. While in wild mode the wireless accessory 201 may be more easily located by finder devices 303. However, beaconing in wild mode consumes a greater amount of power relative to beaconing in near owner mode. Furthermore, the location of the accessory can be detected by nearby devices and uploaded to the device locator server 203. Detection of wireless accessories in wild mode is beneficial when the location of the accessory may be unknown. However, the network resources, server resources, processor cycles, and power consumed by the upload of location data for a wireless accessory is wasted when the accessory is in a known location and within range of one or more owner devices. Accordingly, it is beneficial for wireless accessories to be continuously maintained in near owner mode when within wireless range of owner devices.

Near owner maintenance can be performed by any one of multiple owner devices that are paired with the wireless accessory. As a user or user account may be associated with multiple mobile devices, a single device may be designated as the primary location device for the user for the purposes of reporting to location services. The location for the primary location device is reported to a locator service when reporting the location of the user associated with the device to family members or other users having accounts that are authorized to receive a location for the user. In one embodiment, maintenance is performed by the device that is designated as the primary location device for a user, even if other devices may be present. As described herein, near owner maintenance refers both to maintenance operations such as synchronizing timers, setting or resetting internal counters, checking for error or crash logs, or other operations that are periodically performed on the wireless accessory, as well as periodically establishing a brief connection to the wireless accessory for the purpose of preventing a wild mode transition.

Figure 4:
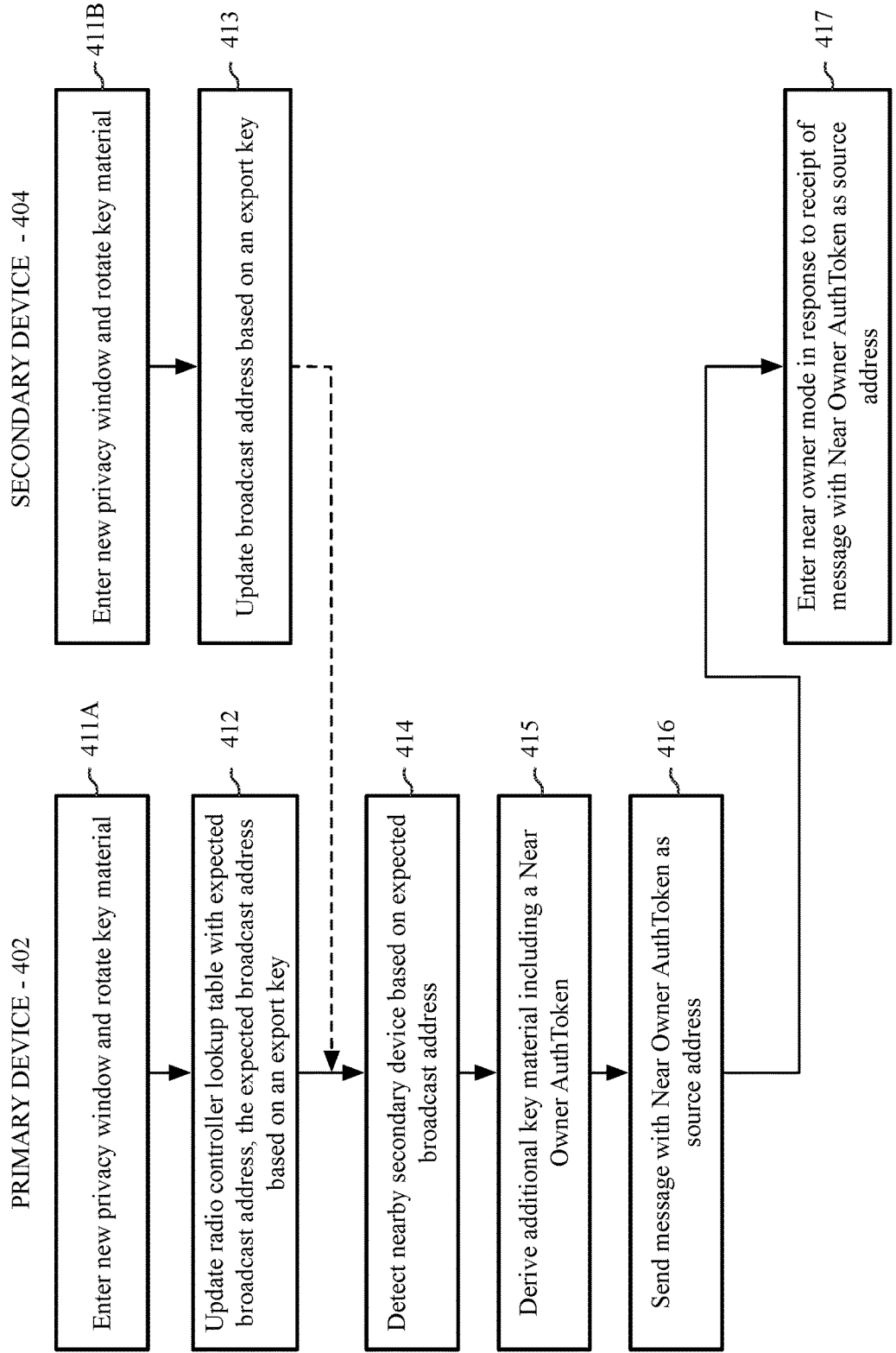
FIG. 4 is a flow diagram of a process of entering a near owner state to perform near owner maintenance at a secondary device.

FIG. 4 is a flow diagram of a process of entering a near owner state to perform near owner maintenance at a secondary device. In one embodiment, a primary device 402 can place a secondary device 404 into a near owner state when the primary device 402 detects the nearby presence of the secondary device 404. The primary device 402 can be an owner device, for example, the mobile device 102, or equivalent devices described herein. The secondary device 404 can be, for example, the wireless accessory 201, or equivalent devices described herein. In one embodiment, the secondary device 404 is placed into the near owner state before certain commands may be issued, to perform maintenance operations, and/or to maintain the near owner state for the secondary device 404.

In one embodiment, the primary device 402 and secondary device 404 can perform operations 411A-411B to enter a new privacy window and rotate key material. The primary device 402 and secondary device 404 can each compute new key material for privacy window i from keys P and SK, where P is a private key, SK is a secret key, and P and SK are collaboratively generated by the primary device 402 and the secondary device 404. The secondary device 404 can be placed into the near owner state using a token that is derived in part based on a command key $CK_i$ and a diversified public key $P_i$.

The primary device 402 can perform an operation 412 to update a radio controller lookup table with an expected broadcast address. The expected broadcast address can be based on an export key, which is a reduced-bit representation of the diversified public key $P_i$. The secondary device 404 can perform an operation 413 to update a broadcast address based on the export key. The primary device 402 and the secondary device 404 can each derive the export key based on the computed key material for the privacy window. The broadcast address of the secondary device 404 is updated by encoding bytes of the export key into the hardware address of the secondary device, for example, by setting the most significant set of bytes of the hardware address to the corresponding bytes of the export key. The primary device 402 can then update a radio controller (e.g., Bluetooth Controller) lookup table to look for the updated hardware address.

The primary device 402 can perform an operation 414 to detect a nearby secondary device based on an expected broadcast address. The primary device 402 can then perform an operation 415 to derive additional key material, which can include a near owner authorization token. In one embodiment a 1:1 mapping exists between a diversified public key $P_i$ and a corresponding near owner authorization token, allowing the tokens to be precomputed for multiple privacy windows. In such embodiment, a near owner authorization token for the privacy window can be derived as:

$$NearOwnerAuthToken_i = MostSignificant6Bytes(MAC(CK_i, \times(P_i) \| \text{"NearOwnerAuthToken"}))$$

The primary device 402 perform an operation 416 to send a message with the near owner authorization token as the source address. In one embodiment the message is a Bluetooth network packet that is sent with the near owner authorization token as the Bluetooth source hardware address. The secondary device 404 can then perform operation 417 to enter near owner mode in response to receipt of message with near owner authorization token as the source address. When the secondary device 404 enters near owner mode, the near owner timeout is reset. The countdown to entering wild mode begins when the primary device 402 disconnects from the secondary device 404.

The primary device 402 and the secondary device 404 can each be associated with a common user account. Cryptographic material that is used by the primary device 402 to connect with the secondary device 404 can be shared with other devices that are associated with the common user account. Those other devices can also perform near owner maintenance on the secondary device 404. However, to prevent multiple devices from attempting to maintain the secondary device 404 can set an indicator in a status field that indicates whether the device has been recently maintained. Owner devices will not attempt to maintain the secondary device 404 when the maintained status is set.

Figure 5:
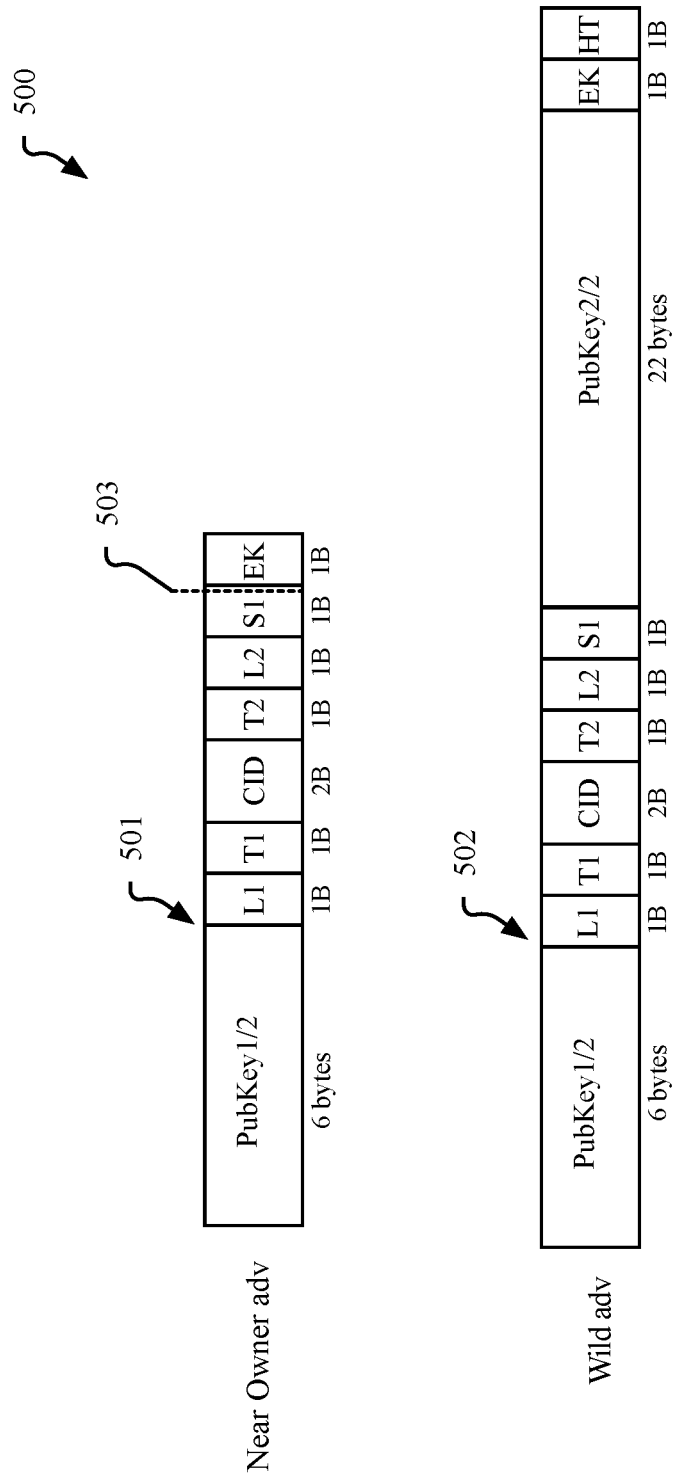
FIG. 5 illustrates advertisement beacon packets for a wireless accessory.

FIG. 5 illustrates advertisement beacon packets 500 for a wireless accessory. Advertisement packets that are broadcast by a wireless accessory can vary based on whether the accessory is in a near owner mode or in a wild mode. In one embodiment the advertisement packets may be Bluetooth Low Energy advertisement packets. However, embodiments are not limited as such. Additionally, the packet formats may differ from standard wireless protocol advertisement packets.

In one embodiment, a near owner advertisement packet 501 includes a first public key portion (PubKey1/2) for use as an advertisement address. The first key portion can include the first six bytes of the current public key for the wireless accessory. In one embodiment, the most significant bits of the advertisement address are constrained to the value 0b11, which specifies a static device address. The actual address bits are instead stored in the EK (extra key) field, along with bits that define a tag type for the wireless accessory if the wireless accessory is a wireless beacon tag. The near owner packet can additionally include fields L1, T1, CID, T2, L2, and S1. L1 is the length of the advertisement type field, T1 is the advertisement type field, CID is the company ID field, T2 is the payload type (e.g., object discovery), L2 is the length of the object discovery field, and S1 is a status flag field. The length of the object discovery payload can vary depending on whether the wireless accessory is in near owner or wild mode. The status flag field can include, for example, the battery state and additional device type flags, such as, for example, whether the wireless accessory is a wireless beacon tag.

A wild mode advertisement packet 502 can include similar fields as the near owner advertisement packet 501. The wild mode advertisement packet 502 can additionally include a second public key portion (PubKey2/2) that includes additional bits of the public key. In one embodiment, the additional bits of the public key or the combined public key (PubKey1/2, PubKey2/2, EK) can be used as a static identifier for the wireless accessory that allows unwanted tracking notifications to be suppressed. In one embodiment the combined public key can also be used as an encryption key by finder devices to encrypt an observed location of the wireless beacon when an observation is uploaded to a device locator server.

In one embodiment the status flag field S1 of the near owner advertisement packet 501 includes a maintained bit 503. The maintained bit 503 indicates whether near owner maintenance has been performed during a given key rotation period. During each key rotation, the maintained bit 503 can be cleared to indicate that the device is in unmaintained near owner mode, is available for near owner maintenance connections, and will soon transition into wild mode if not maintained. The maintained bit can be used to facilitate near owner maintenance by multiple owner devices.

Multiple Device Near Owner Maintenance

As described above, when there is a single owner device associated with an online account, that device bears the responsibility of performing near owner maintenance on wireless accessories to prevent those accessories from transitioning into wild mode while in the presence of the owner device. The owner device can configure the near owner timeout for a wireless accessory during a secure connection with the accessory. Upon disconnection, the accessory will begin counting down from the configured timeout and will transition to wild mode when the countdown reaches zero. The owner device can re-connect to the wireless accessory before the countdown reaches zero to prevent the transition to wild mode.

When a user has multiple devices associated with an online account, any of those devices can be configured to perform near owner maintenance. This functionality is useful in the case where a wireless accessory is left at home with, for example, a tablet computer device, when the user leaves home with a smartphone device. Additionally, where wireless accessories are shared between users, cryptographic material can be shared between the accounts of those users to enable devices of the recipient of a shared accessory to connect with the accessory. The recipient of the shared accessory can then perform near owner maintenance on the accessory when the accessory is within wireless range.

An arbitration system between multiple devices that are capable of performing near owner maintenance is used to prevent the battery drain that would accompany repeated maintenance connections from the multiple devices within the same time period. With reference to the advertisement beacon packets 500 of FIG. 5, the maintained bit 503 of the status field S1 of a near owner advertisement packet 501 is used to indicate when a wireless accessory has received a maintenance connection during a key rotation period. The maintained bit can be cleared at the beginning of each key rotation period.

Figure 6:
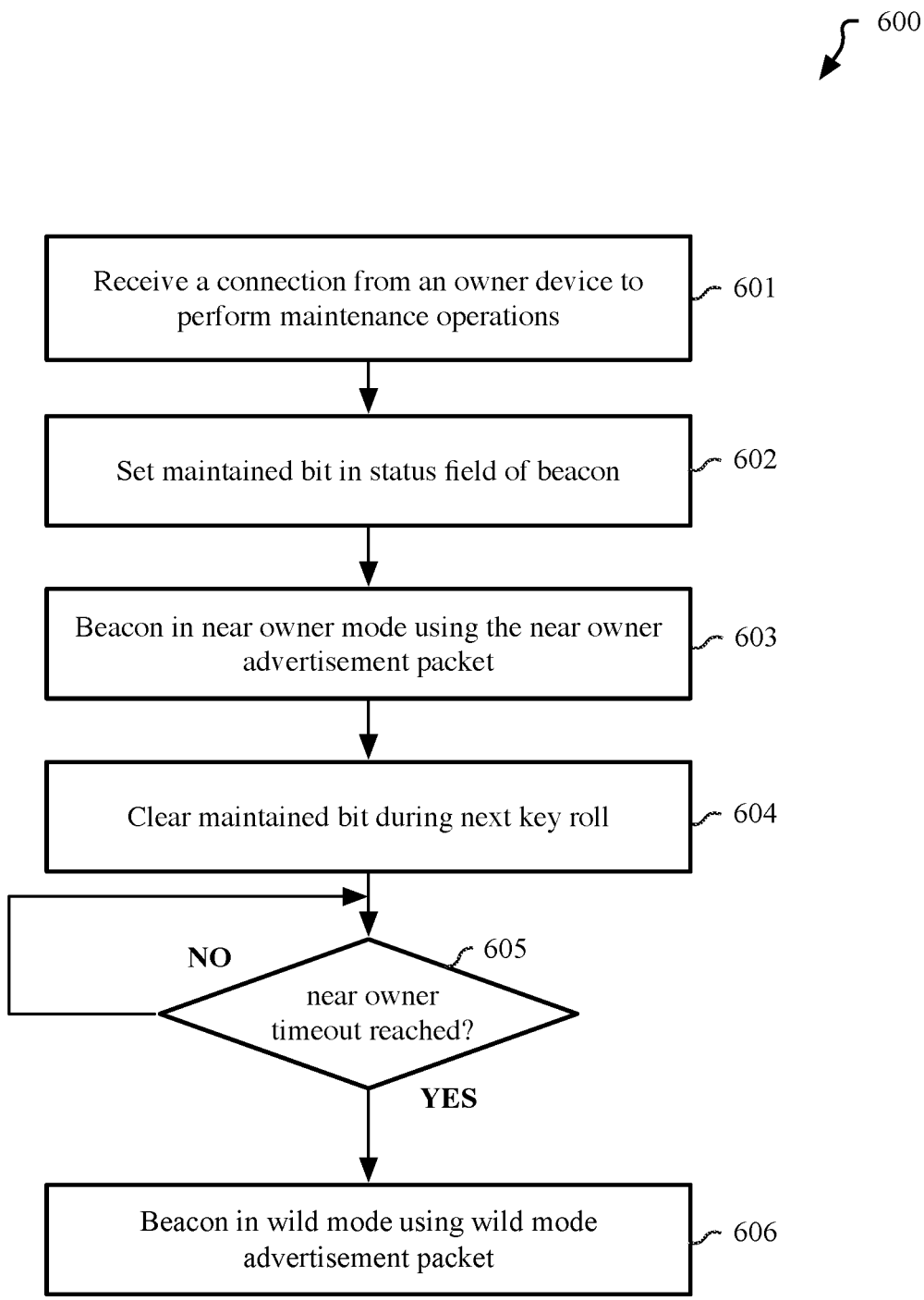
FIG. 6 illustrates a method of operation on a wireless accessory to transition from near owner advertisement mode to wild advertisement mode.

FIG. 6 illustrates a method 600 of operation on a wireless accessory to transition from near owner advertisement mode to wild advertisement mode. Method 600 can be performed by any wireless device, wireless accessory, or wireless accessory device as described herein. In one embodiment, a wireless device can receive a connection from an owner device to perform maintenance operations (block 601). The wireless device can then set a maintained bit in the status field of the advertisement beacon (block 602). The maintained bit can be set for the duration of the connection by the owner device and for a period of time after the connection is disconnected. After disconnection, the wireless device can beacon in near owner mode using the near owner advertisement packet (block 603).

The wireless device can clear the maintained bit during the next key roll on the wireless device (block 604). Clearing the maintained bit indicates to nearby owner devices that the device will soon transition to wild mode unless near owner maintenance is performed and indicates to any nearby owner devices that a maintenance operation can be performed to prevent a wild mode transition.

If the near owner timeout is reached without an owner device connecting to perform maintenance (block 605, YES), then the wireless device can enter wild mode and begin beaconing in wild mode using the wild mode advertisement packet (block 606). While in the wild mode, the wireless device broadcasts a wild mode advertisement packet that is discoverable to finder devices that are in wireless range of the wireless accessory. The beacon rate of the wireless device may be increased relative to the beacon rate while in near owner mode. Nearby finder devices, upon detection of a wild mode advertisement, can attempt to determine or estimate a location of the wireless device relative to the finder device and upload the determined or estimated location to a device location server, with the determined or estimated location indexed on the device location server by a hash of the wild mode address broadcast by the wireless device.

Figure 7:
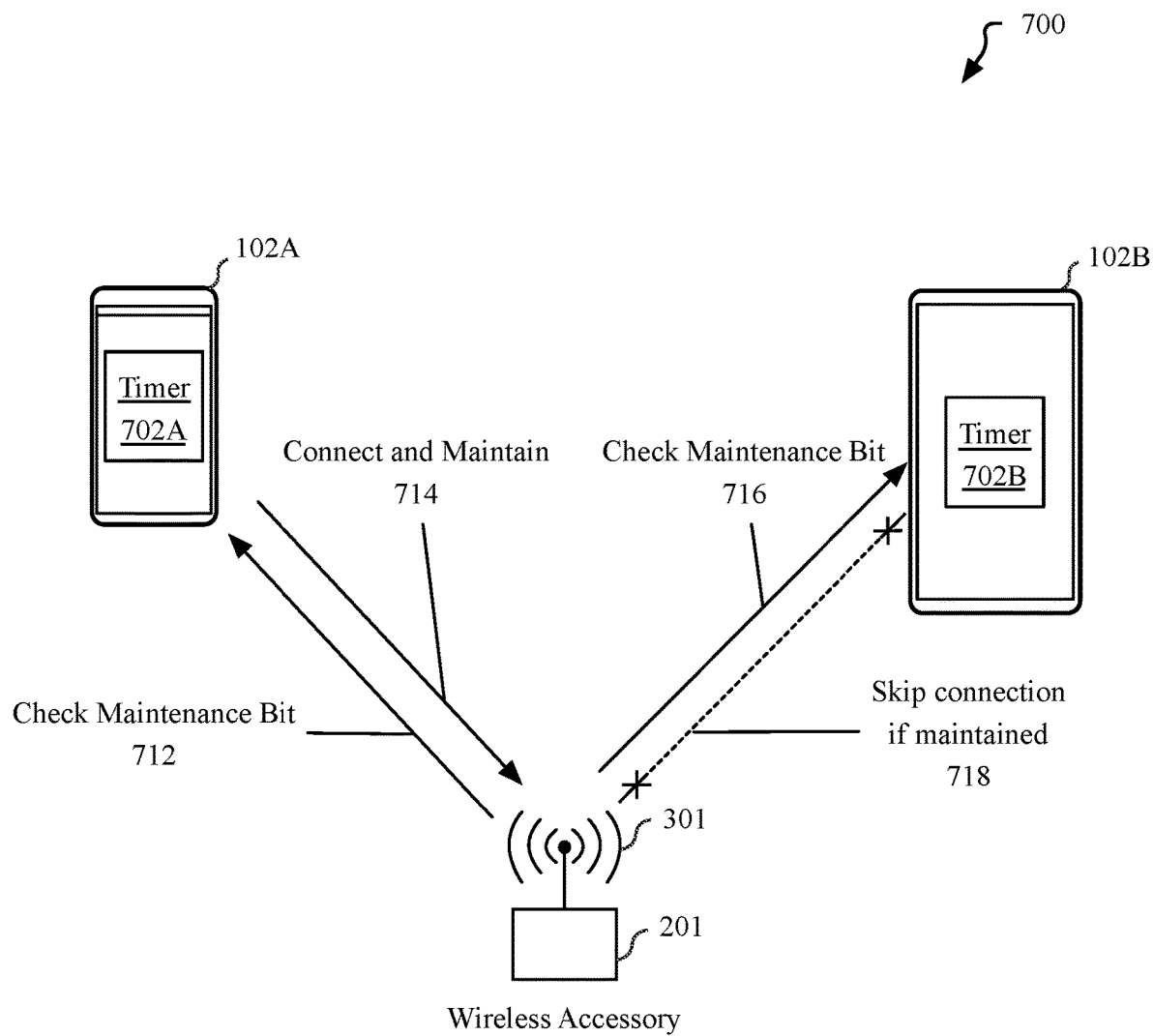
FIG. 7 illustrates a system to enable near owner maintenance using multiple devices.

FIG. 7 illustrates a system 700 to enable near owner maintenance using multiple devices. The system 700 includes multiple mobile devices 102A-102B that each store cryptographic material that enables the devices to establish a secure connection with the wireless accessory. Each mobile device 102A-102B includes at least one timer 702A-702B that periodically triggers on the device. When the timer 702A-702B triggers, the device can scan for a beacon signal 301 broadcast by the wireless accessory 201. The device can also check a scan buffer or scan cache to determine if any advertisement packets associated with the beacon signal 301 were received in the time period before the triggering of the timer 702A-702B. Mobile device 102A, for example, may detect an advertisement packet that is broadcast by the wireless accessory 201 and check the maintained bit (712) in the status field of the advertisement packet. If the maintained bit indicates that the wireless accessory has not been recently maintained (e.g., within the current key rotation period), the mobile device 102A can connect (714) to the wireless accessory 201 and perform one or more maintenance operations, such as performing error checking operations, synchronizing timers, resetting counters, and other operations that are to be periodically performed on the wireless accessory 201. Upon expiration of the timer 702B at mobile device 102B, the mobile device 102B can also perform a wireless scan and/or check a scan buffer or scan cache. Upon detection of a wireless advertisement packet, mobile device 102B can check the maintained bit (716). Mobile device 102B can then skip establishing a connection (718) if the wireless accessory has been recently maintained according to the maintained bit in the advertisement packet of the beacon signal 301.

In various embodiments, multiple instances of the timer 702A-702B may be used on each of the mobile devices 102A-102B. For example, a device can use an opportunistic timer that can trigger opportunistically before or after the timer deadline to take advantage of other timer or wake events that occur or are scheduled to occur around the timer deadline. Taking advantage of opportunistic events avoids causing a separate device or processor wake from a low power state solely to service the opportunistic timer, reducing the overall number of wake events. The device may pair the opportunistic timer with a precise timer that fires precisely at a set time interval as a backstop to the opportunistic timer.

In various embodiments, the duration of the near owner timeout and the number, type, and configuration of the timers can vary, but are generally set to complementary values. Every M minutes, a new K byte key is selected for use as, or to enable derivation of, a beacon identifier that is broadcast by the wireless accessory. The near owner timeout period can be configured for M+I minutes after disconnection of an encrypted communication session between the owner device and the connection. In various embodiments, the value of I can be set to between one and five minutes, but is not limited to any specific value.

In one embodiment, an 15 minute near owner timeout is used with a maintenance timer set for 14 minutes. In one embodiment a 20 minute near owner timer is used with a maintenance timer set for 18 or 19 minutes. In some embodiments, timers are synchronized across devices that can perform near owner maintenance.

Figure 8A:
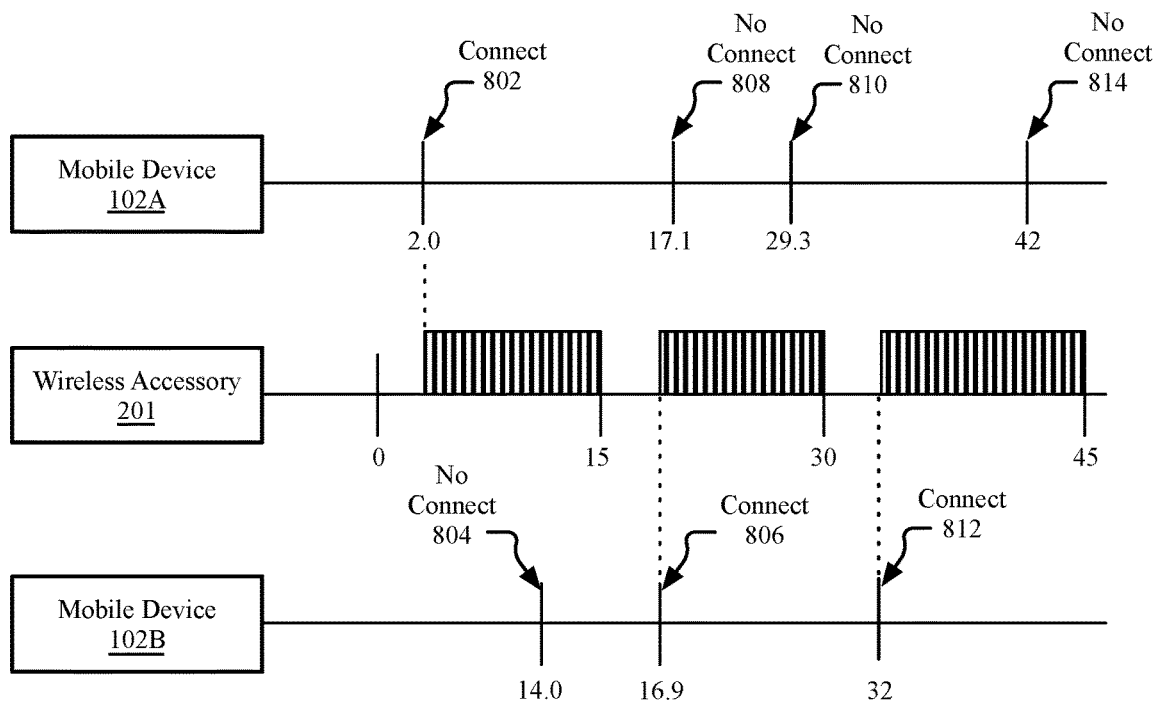
FIG. 8A-8B illustrate status and connection timing diagrams for multiple owner devices and a wireless accessory.
Figure 8B:
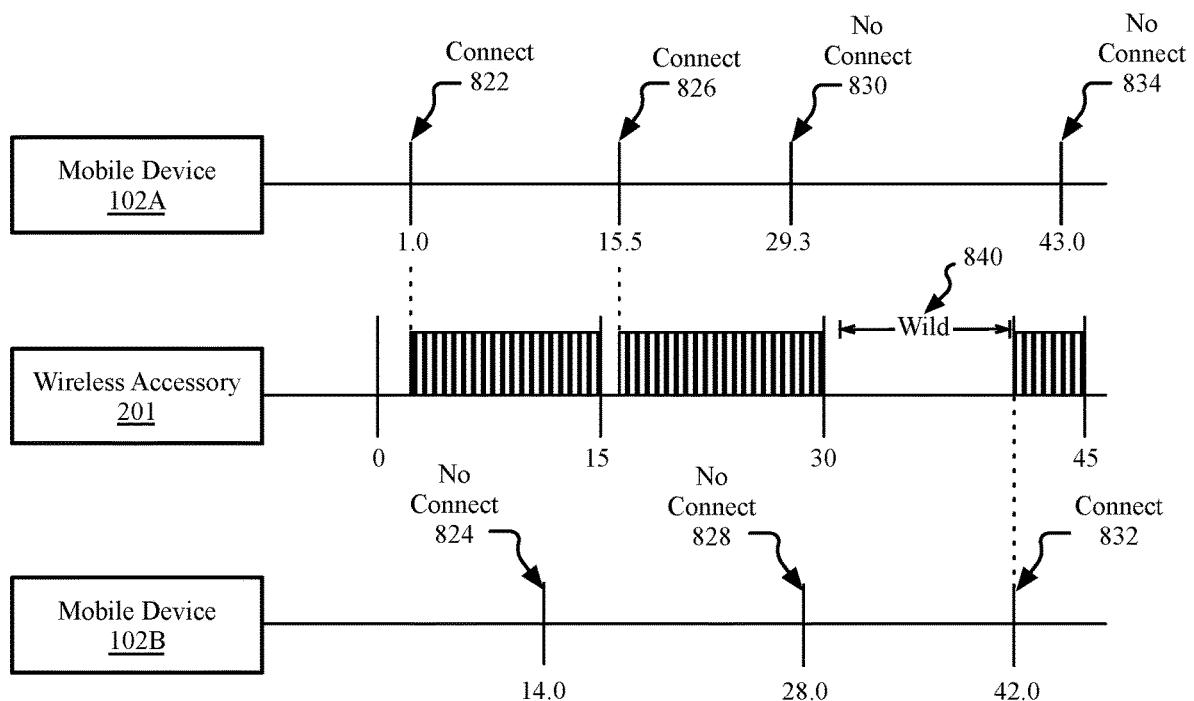

FIG. 8A-8B illustrate status and connection timing diagrams for multiple owner devices and a wireless accessory, according to one embodiment. Mobile devices 102A-102B can operate as owner devices. However, the owner devices are not limited to any specific type of electronic device. The techniques performed by the wireless accessory 201 can be performed by any wireless device or wireless accessory described herein. The wireless accessory 201 is configured with an 15 minute key rotation period and a 15 minute near owner timeout. The mobile devices 102A-102B are configured with 14 minute opportunistic timers. The top portion of the timeline of the wireless accessory 201 indicates the status of the maintained bit 503 that is broadcast in the status field S1 of the near owner advertisement packet 501 that is broadcast by the wireless accessory 201.

As shown in FIG. 8A, mobile device 102A can connect (802) at the two minute mark. If the wireless accessory 201 is in wild mode, the mobile device 102A can place the wireless accessory 201 into near owner mode to establish the connection. For the duration of the connection, and for 15 minutes after disconnection, the wireless accessory 201 will remain in near owner mode. For the duration of the connection, and until the next key rotation, the wireless accessory will set the maintained bit in the status field of the advertisement packet. When a timer event occurs on mobile device 102B at 14 minutes, no connection (804) is performed by the mobile device 102B because the maintained bit is set in the near owner advertisement.

At the 15 minute mark the wireless accessory 201 will rotate to new key and begin broadcasting a new beacon identifier that is based on the new key. During the key rotation, the maintained bit in the status field is cleared. At the 15 minute mark, mobile devices 102A-102B also rotate the key that is used to connect to the wireless accessory 201 and will used the new key to connect to the wireless accessory 201. When the opportunistic timer on mobile device 102B fires at 16.9 minutes, the mobile device 102B will use the new key to connect (806) with the wireless accessory. Establishing the connection causes the wireless accessory 201 to set the maintained bit and reset the near owner timeout. The countdown to the near owner timeout begins counting down upon termination of the connection. Subsequent opportunistic timer events on the mobile device 102A at 17.1 minutes (808) and 29.3 minutes (810) will not result in a connection to the wireless accessory 201 due to the presence of the maintained bit in the status field of the near owner advertisement packet. The maintained bit is then cleared at the 30 minute mark during a key rotation on the wireless accessory 201. Mobile device 102 detects that the wireless accessory 201 has not been maintained during an opportunistic timer events at 32 minutes and established a connection (812) with the wireless accessory 201. No connection (814) is established by mobile device 102A in response to a timer event at 42 minutes.

As the opportunistic timers on the mobile devices 102A-102B can fire early or late, it may be possible for a timer event to occur twice during the same key rotation period. For example, two timer events occur between the 15 minute and 30 minute marks for mobile device 102A. Were it not for the timer event at 32 minutes that occurred on mobile device 102B, wireless accessory 201 would have transitioned into wild mode. With a 15 minute near owner timeout, a wild mode transition may still occur for a brief period of time before the connection (812) by mobile device 102B at 32 minutes depending on the duration of the connection (806) established at 16.9 minutes.

FIG. 8B illustrates how multiple timer firings within a key rotation period can result in a wild mode transition. Mobile device 102A can connect (822) to the wireless accessory 201 at the one minute mark and connect (826) once again at the 15.5 minute mark. Mobile device 102B will not connect (824) at the 14.0 minute mark because the maintained bit is set by the wireless accessory 201. Mobile device 102B will not connect (828) at the 28 minute mark because the maintained bit is set. However, mobile device 102A will also not connect (830) at the 29.3 minute mark due to an early opportunistic wake. Double maintenance timer events during the same key rotation period can cause a longer period of time to occur before the next event fires at either of mobile device 102A or mobile device 102B, causing a near owner timeout to occur on the wireless accessory 201. The near owner timeout occurs 15 minutes after the termination of the last secure connection. The wireless accessory 201 will then begin broadcasting in wild mode 840 and become visible to finder devices, even though the wireless accessory 201 is actually near associated owner devices. In one scenario, the wireless accessory 201 will remain in wild mode until returned to near owner mode for a connection (832) by mobile device 102B at 42 minutes. Mobile device 102 will not connect (834) to the mobile device 102 at the occurrence of the next timer event at 43 minutes because the maintained bit is set and wireless accessory 201 was returned to near owner mode by mobile device 102B one minute earlier.

Various solutions can be applied to prevent the wireless accessory 201 from broadcasting in wild mode 840, or reduce the duration in which the wireless accessory 201 is in wild mode. In one embodiment, if either of mobile device 102A or mobile device 102B detect a wild mode packet that is matched to wireless accessory 201, the device can immediately connect to the wireless accessory 201 to place it back into near owner mode. In one embodiment, near owner timeouts and opportunistic timer settings can be adjusted to reduce the likelihood of a double timer event during the same key rotation period.

Figure 9A:
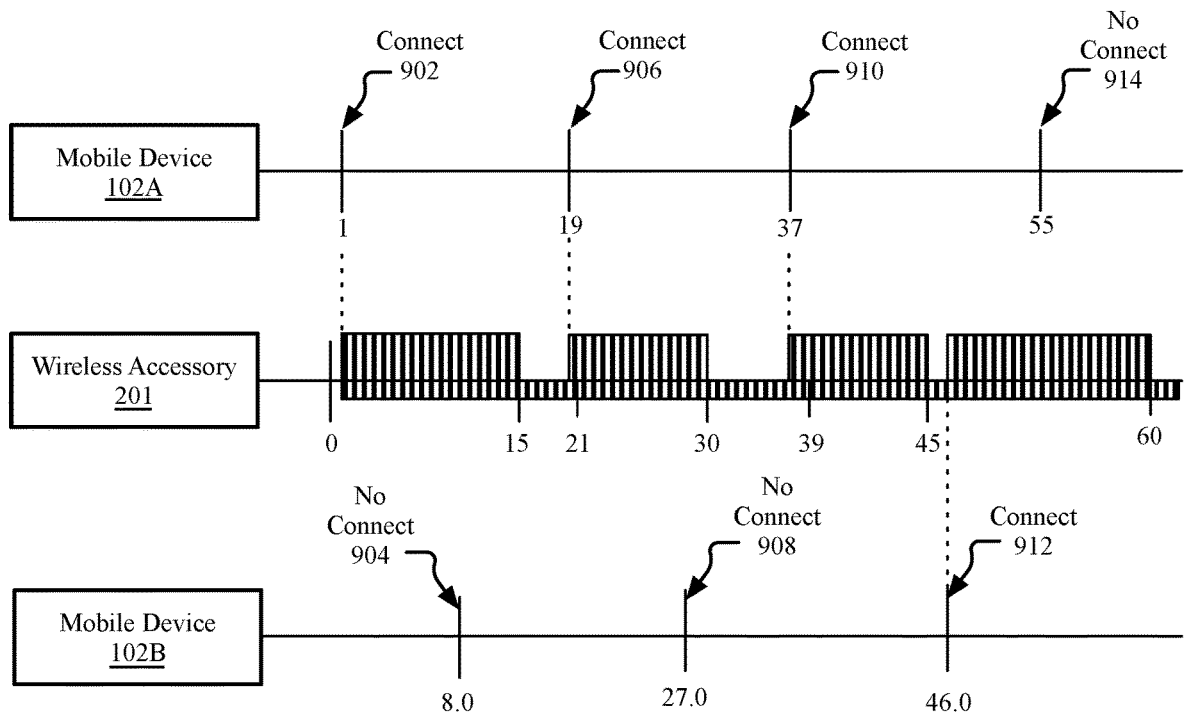
FIG. 9A-9B illustrate status and connection timing diagrams for multiple owner devices and a wireless accessory, according to an additional embodiment.
Figure 9B:
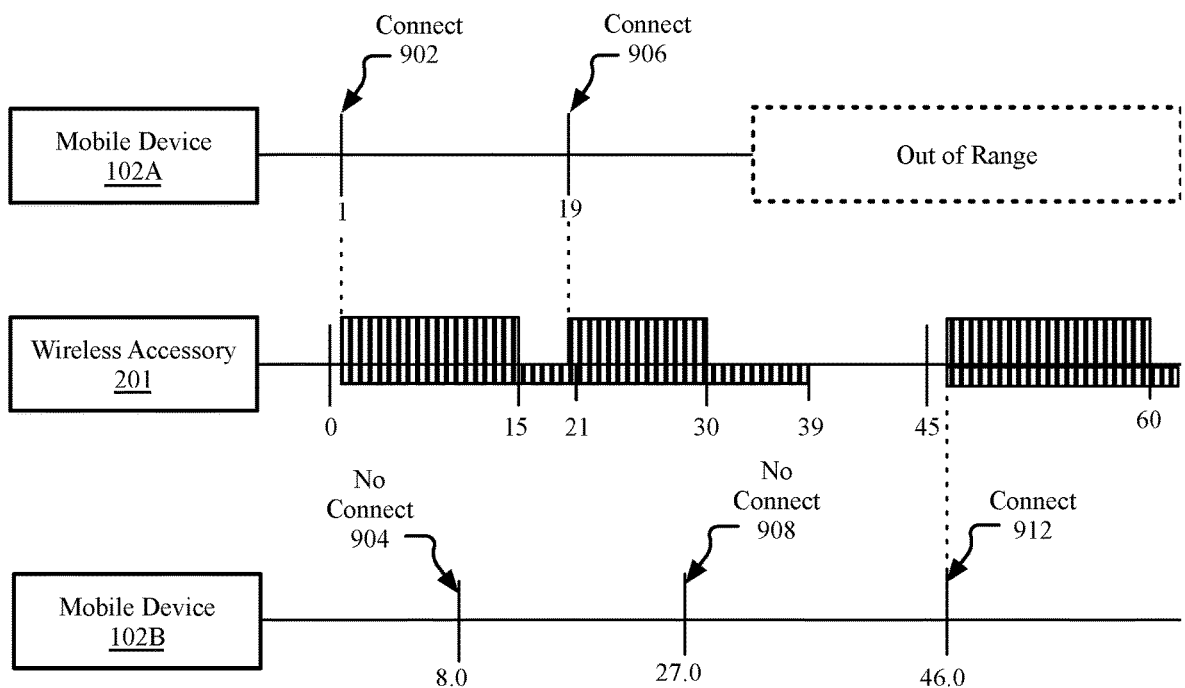

FIG. 9A-9B illustrate status and connection timing diagrams for multiple owner devices and a wireless accessory, according to an additional embodiment. In one embodiment, a near owner timeout of 20 minutes is used, along with 18 minute opportunistic timers. This timer configuration significantly reduces the likelihood of two maintenance timer firings within a single 15 minute key rotation period. Furthermore, if an entire key rotation period is missed, a timer is likely to fire before the wireless accessory 201 transitions into wild mode.

In FIG. 9A-9B, the upper portion of the timeline of the wireless accessory 201 indicates the status of the maintained bit, while the lower portion indicates whether the wireless accessory 201 is in near owner mode. As shown in FIG. 9A, the near owner timeout of 20 minutes, with opportunistic 18 minute timers, enables the wireless accessory 201 to be consistently maintained in near owner mode by mobile devices 102A-102B. Mobile device 102A can connect (902, 906, 910) at 1 minute, 10 minutes, and 37 minutes respectively. No connection (914), is performed at 55 minutes as the wireless accessory 201 was maintained by mobile device 102B by a connection (912) at 46 minutes. No maintenance connection (904, 908) is established at 8 minutes and 27 minutes by mobile device 102B because to the wireless accessory 201 was maintained beforehand by mobile device 102A during the respective key rotation periods.

The timer configuration of FIG. 9A does not address the scenario in which the device that is generally being used to perform maintenance goes out of wireless range of the wireless accessory 201. As shown in FIG. 9B, if mobile device 102A goes out of range of the wireless accessory 201 for a period of time after the connection (906) by mobile device 102A at the 19 minute mark, the wireless accessory 201 may transition into wild mode at approximately the 39 minute mark and may remain in wild mode until placed back into near owner mode by mobile device 102B by a connection (912) by mobile device 102B at the 46 minute mark. One mitigation option is to configure the mobile devices 102A-102B to immediately connect to the wireless accessory 201 when a wild mode advertisement packet that resolves to the accessory is detected. In one embodiment, the wild mode transition may be avoided entirely by synchronizing the maintenance timers of the mobile devices 102A-102B.

Figure 10:
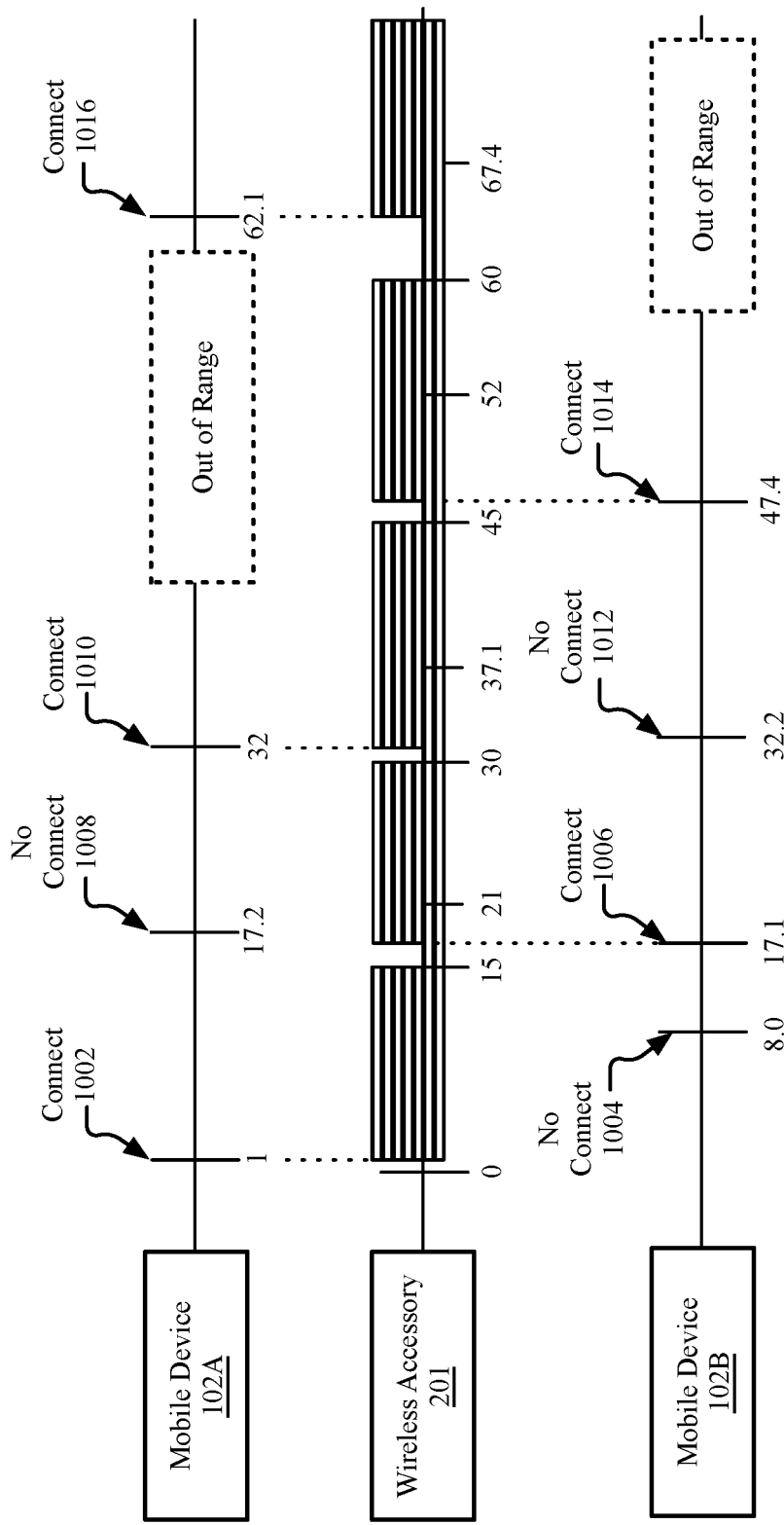
FIG. 10 illustrates status and connection timing diagrams for multiple owner devices and a wireless accessory using synchronized maintenance timers.

FIG. 10 illustrates status and connection timing diagrams for multiple owner devices and a wireless accessory using synchronized maintenance timers. In one embodiment the maintenance timers may be synchronized once the mobile devices 102A-102B determine that they are each maintaining the wireless accessory 201. Mobile device 102A can connect (1002) at the one minute mark and place the mobile device 102 in near owner mode. Mobile device 102B will not connect (1004) in response to a timer event at eight minutes because the maintained bit is set by the wireless accessory 201. The mobile devices 102A-102B may then synchronize their timers to each fire 2-3 minutes after a key rotation, with a random variance added to each timer so that both devices do not attempt to maintain the wireless accessory 201 at the same time.

Once synchronized, mobile device 102B can connect (1006) at the 17.1 minute mark before the near owner timeout occurs at 21 minutes. No connection (1008) is established by mobile device 102A in response to a maintenance timer event at 17.2 minutes due to the presence of the maintained bit in the status field broadcast by wireless accessory 201. Mobile device 102A can connect (1010) in response to a timer event at 32 minutes before the near owner timeout at 37.1 minutes. No connection (1012) is required to be established in response to a timer event at 32.2 minutes at mobile device 102B. If mobile device 102A goes out of range, mobile device 102B can maintain the wireless accessory 201 at the same cadence as mobile device 102A. Mobile device 102B can connect (1014) in response to a timer event at 47.4 minutes while mobile device 102A is out of range before the near owner timeout at 52 minutes. Mobile device 102A can connect (1016) in response to a timer event at 62.1 minutes before the near owner timeout at 67.4 minutes while mobile device 102B is out of range.

The synchronized maintenance timers may be precise timers or opportunistic timers. Precise timers will fire as scheduled but may result in an increased number of system wakeups, which may increase the overall power consumption of a device. However, depending on the implementation of the opportunistic timer, in some systems it may be difficult to constrain the time period in which opportunistic timers will fire. In one embodiment, a dual maintenance timer system may be used that includes a combination of opportunistic and precise timers. The precise timer functions as a backstop timer to the opportunistic timer. If the opportunistic timer event occurs within a range of the intended firing time, the next precise timer can be cancelled and no additional wakes will be required. If the opportunistic timer fires outside of a threshold of the intended time, the precise timer can be maintained.

In some embodiments the dual maintenance timer system may be implemented with a dual mode timer having characteristics of both precise and opportunistic timers. In such embodiment, a dual mode timer can be defined that will fire no later than a specified time, but may opportunistically fire as early as a time defined by a specified early fire percentage. For example, a dual mode timer may be defined with a specified time of 15 minutes and an early fire percentage of ninety percent of the timer value (13.5 minutes). In such example, the dual mode timer is guaranteed to fire at some point between 13.5 minutes and 15 minutes, either opportunistically firing any time between 13.5 and 15 minutes to coalesce with another wake event or firing at 15 minutes if an opportunistic firing does not occur.

Figure 11:
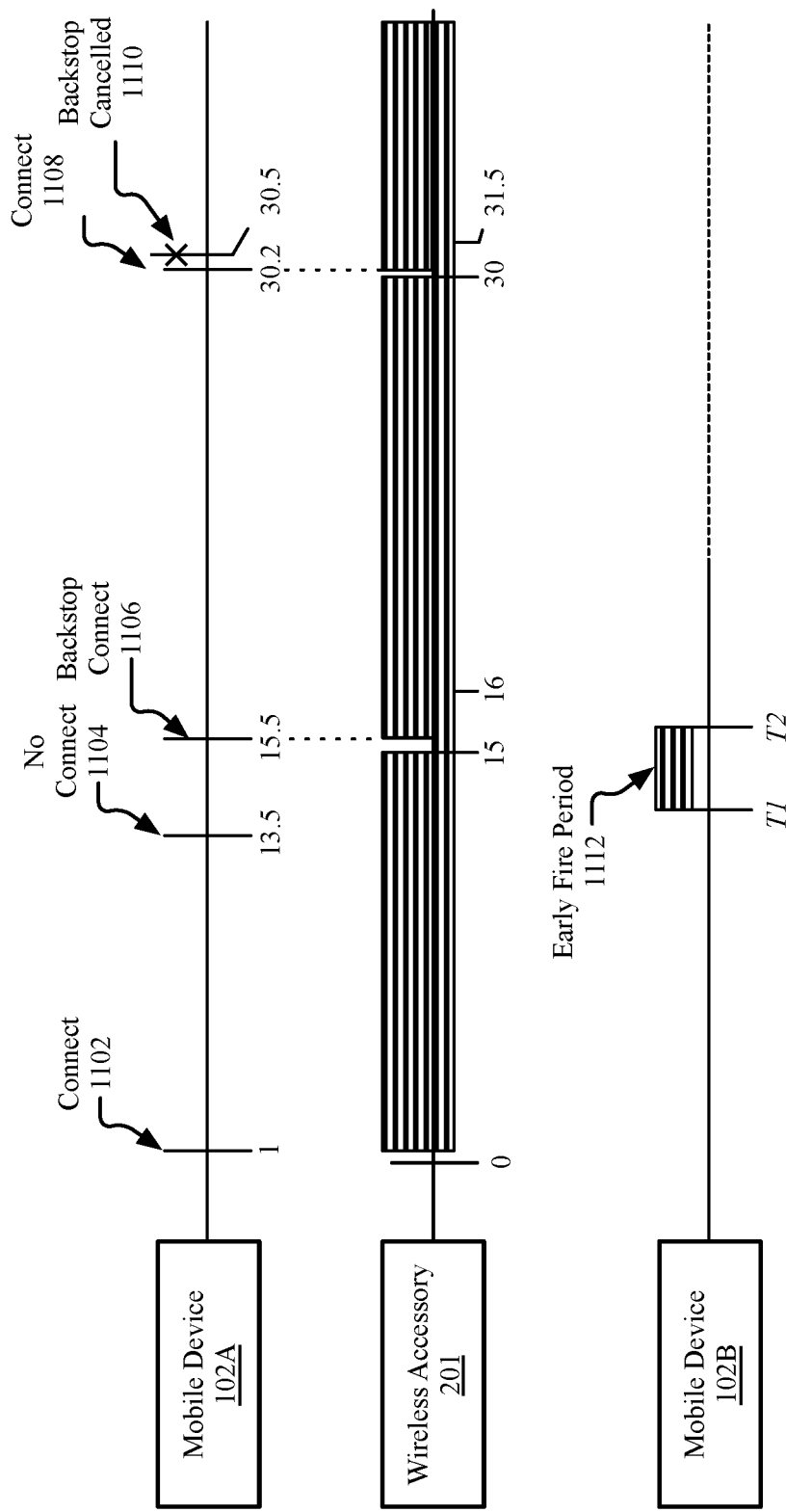
FIG. 11 illustrates status and connection timing diagrams for multiple owner devices and a wireless accessory using dual maintenance timers and/or dual mode timers.

FIG. 11 illustrates status and connection timing diagrams for multiple owner devices and a wireless accessory using dual maintenance timers and/or dual mode timers. Near owner maintenance status is shown above the timeline for wireless accessory 201, while near owner state is shown below the timeline. In the illustrated embodiment, the opportunistic maintenance timer is set for 15 minutes, with a near owner timeout of 16 minutes, and a key rotation period of 15 minutes.

In one scenario, mobile device 102A can connect (1102) to the wireless accessory 201 and place the wireless accessory 201 in near owner mode. The wireless accessory 201 will set the maintained bit in the near owner advertisement status field. The opportunistic timer of mobile device 102A may be configured to fire at 15 minutes but may opportunistically fire at 13.5 minutes to coalesce with another wake event. As a result of the early firing of the opportunistic timer, the maintenance bit is still set by the wireless accessory and no connection (1104) is established. To prevent a wild mode transition at the wireless accessory 201, the backstop timer can fire shortly after the beginning of a new key rotation period (e.g., 15.5 minutes) and connect (1106) with wireless accessory 201 to prevent the wireless accessory 201 from transitioning in to wild mode 17 minutes after termination of the previous encrypted connection. When an opportunistic timer event occurs on mobile device 102A within a threshold of the intended time, the backstop timer can be cancelled. For example, if the maintenance timer on mobile device 102A is intended to fire shortly after the beginning of a new key rotation period at the 30 minute mark and fires at 30.2 minutes, mobile device 102A can connect (1108) to the wireless accessory 201 to perform near owner maintenance and prevent the wireless accessory 201 from going into wild mode at 31.5 minutes, which is 16 minutes after the most recent connection to the wireless accessory 201. Mobile device 102A can then cancel (1110) the backstop timer that is scheduled to fire at 30.5, which may prevent an additional wake event from occurring on mobile device 102A if the device would have been in a low power state when the backstop timer event was scheduled to occur.

Wake mitigations can be applied to the dual timer system to further mitigate the number of increased wakes that may occur due to the use of the backstop timer. In one embodiment, the backstop timer may be configured as a non-waking timer. Instead of waking the application processor of the mobile device 102A, a low power processor, such as a wireless processor, can examine a scan cache in which advertisement packets can be stored while mobile device 102A is in a low power state. A wake event can be avoided if the stored packets indicate that any nearby wireless accessories have already been maintained.

In one embodiment, similar timer events may occur for mobile device 102B when within wireless range of the wireless accessory 201. In another embodiment, mobile device 102B may be configured to use a dual mode timer that may opportunistically fire during an early fire period 1112 that spans between time T1 and time T2. If the dual mode timer does not fire opportunistically during the early fire period 1112, the dual mode timer will fire at time T2. When the dual mode timer fires, the mobile device 102B can check the status of the maintained bit in the status field of an advertisement packet broadcast by the wireless accessory 201 to determine whether to perform maintenance operations on the wireless accessory 201. Mobile device 102B will then connect with the wireless accessory 201 if the status field indicates that the accessory has not been recently maintained.

In various embodiments, mobile devices may be configured to maintain wireless accessories using any of the timer systems described herein. All mobile devices may be configured to use the same timer system. Alternatively, different mobile devices may be configured to use different timer systems. The timer system may be configured based on the type of mobile device or can differ based on a software, hardware, or firmware version of the mobile device and/or wireless accessory.

Figure 12:
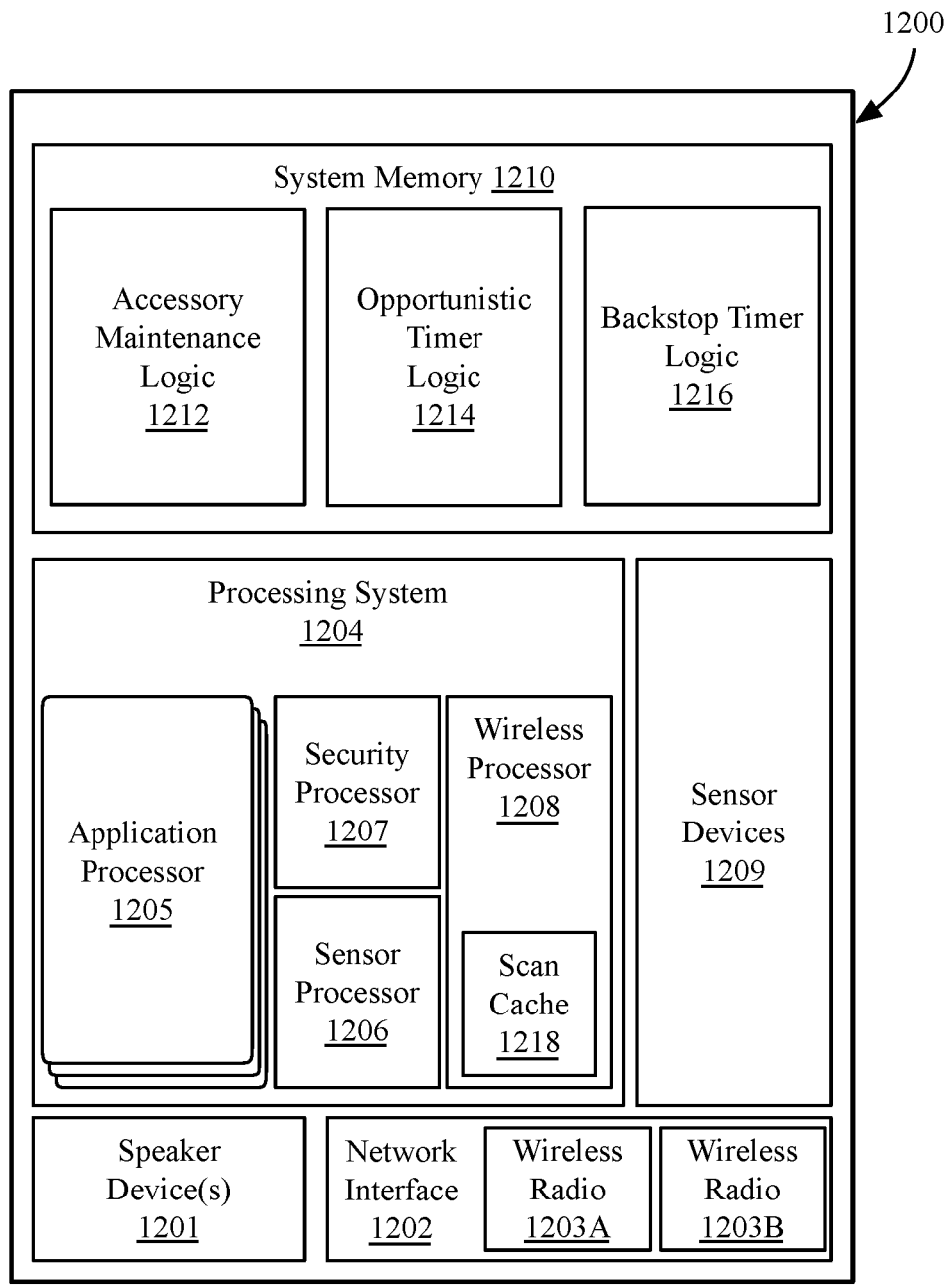
FIG. 12 illustrates an electronic device that includes hardware and software logic to enable multi-device near owner maintenance for a wireless accessory.

FIG. 12 illustrates an electronic device 1200 that includes hardware and software logic to enable multi-device near owner maintenance for a wireless accessory. The electronic device 1200 can be any electronic device that is configurable to perform near owner maintenance. The electronic device 1200 includes a processing system 1204 having multiple types of processors. The electronic device 1200 also includes one or more memory devices that are configured as system memory 1210. The processing system 1204 includes an application processor 1205, a sensor processor 1206, a security processor 1207, and a wireless processor 1208. The application processor 1205 processor can be a multi-core processor, with different cores having different performance and/or efficiency ratings. The electronic device also includes one or more speaker devices 1201 to enable playback of the audio portion of media, alarms, alerts, notifications, and/or telephone calls.

A network interface 1202 couples with the wireless processor 1208 and includes a set of wireless radios 1203A-1203B. The network interface 1202 can enable support for wireless networking protocols such as, but not limited to Bluetooth, Wi-Fi, near field communication (NFC), and/or other wireless networking technologies. In some implementations, the network interface 1202 may also support a wired network connection. In one embodiment the network interface 1202 and wireless processor 1208 include hardware and/or software logic to optimize the coexistence of different wireless protocols that communicate within the same or similar bands. For example, the duty cycle of Bluetooth transmissions can be reduced during the heavy use of Wi-Fi in the 2.4 GHz band. Scans for Bluetooth advertisement packets or connection attempts to wireless accessories can be performed over a longer period of time at a reduce duty cycle to avoid interfering with Wi-Fi transmission. When the heavy 2.4 GHz Wi-Fi usage ceases, the scan or connection can be restarted at a higher duty cycle.

The wireless processor 1208 includes on-chip memory, or is attached to a memory device, that can be used as a scan cache 1218. The scan cache 1218 can store advertisement packets that are received via the one or more of the wireless radios 1203A-1203B while the application processor 1205 is in a low power state. When the application processor 1205 wakes due to use of the electronic device 1200 by a user, or in response to a timer wake event, the application processor 1205 can check the scan cache for received advertisement packets before performing a discovery scan. In some scenarios, the discovery scan can be bypassed. For example, if the scan cache 1218 includes a near owner advertisement packet from the current key rotation period that indicates that the wireless accessory has been maintained, a discovery scan for that wireless accessory may be skipped.

The electronic device 1200 also includes a set of sensor devices 1209. The sensor devices 1209 include a variety of sensors including but not limited to motion sensors, light sensors, proximity sensors, biometric sensors, audio sensors (e.g., microphones), and image sensors (e.g., cameras). The sensor devices 1209 can also include an accelerometer, gyroscope, or other motion sensors that can detect and analyze the movement of the electronic device 1200. The sensor processor 1206 can enable low-power monitoring of always-on sensors within the suite of sensor devices 1209.

The system memory 1210 can be a system virtual memory having an address space that includes volatile and non-volatile memory. The system memory 1210 can store instructions for software logic that is executed by the processing system 1204. The software logic includes system logic such as accessory maintenance logic 1212, opportunistic timer logic 1214, and backstop timer logic 1216.

The accessory maintenance logic 1212 enables near owner maintenance operations to be performed by the electronic device 1200. The near owner maintenance operations include detecting wild mode advertisement packets from a known wireless accessory and determining a maintained status for the wireless accessory. If a detected wireless accessory is in wild mode or unmaintained near owner mode, the accessory maintenance logic can determine or facilitate determination of keys used to use to place the wireless accessory into near owner mode and to use to connect to the wireless accessory. Once connected with the wireless accessory, the accessory maintenance logic 1212 can determine an operational state for the wireless accessory, including gathering error and/or crash logs. The accessory maintenance logic 1212 can also synchronize and/or reset timers and counters on the wireless accessory.

The opportunistic timer logic 1214 can configure opportunistic timers on the electronic device 1200. A timer allows a process to schedule a delayed or periodic action. The timer waits until a certain interval has elapsed and then fires, performing a specific action such as checking the scan cache 1218 or performing a wireless discovery scan. Waking the system from an idle state incurs an energy cost when the application processor 1205 and other systems are awakened from their low-power, idle states. Accordingly, reducing the number of wakeups by performing some deferred tasks early or late during another wakeup can reduce the overall power consumption of the electronic device 1200. In one embodiment, dual mode timers can be configured that makes use of both the opportunistic timer logic 1214 and the backstop timer logic 1216.

Figure 13:
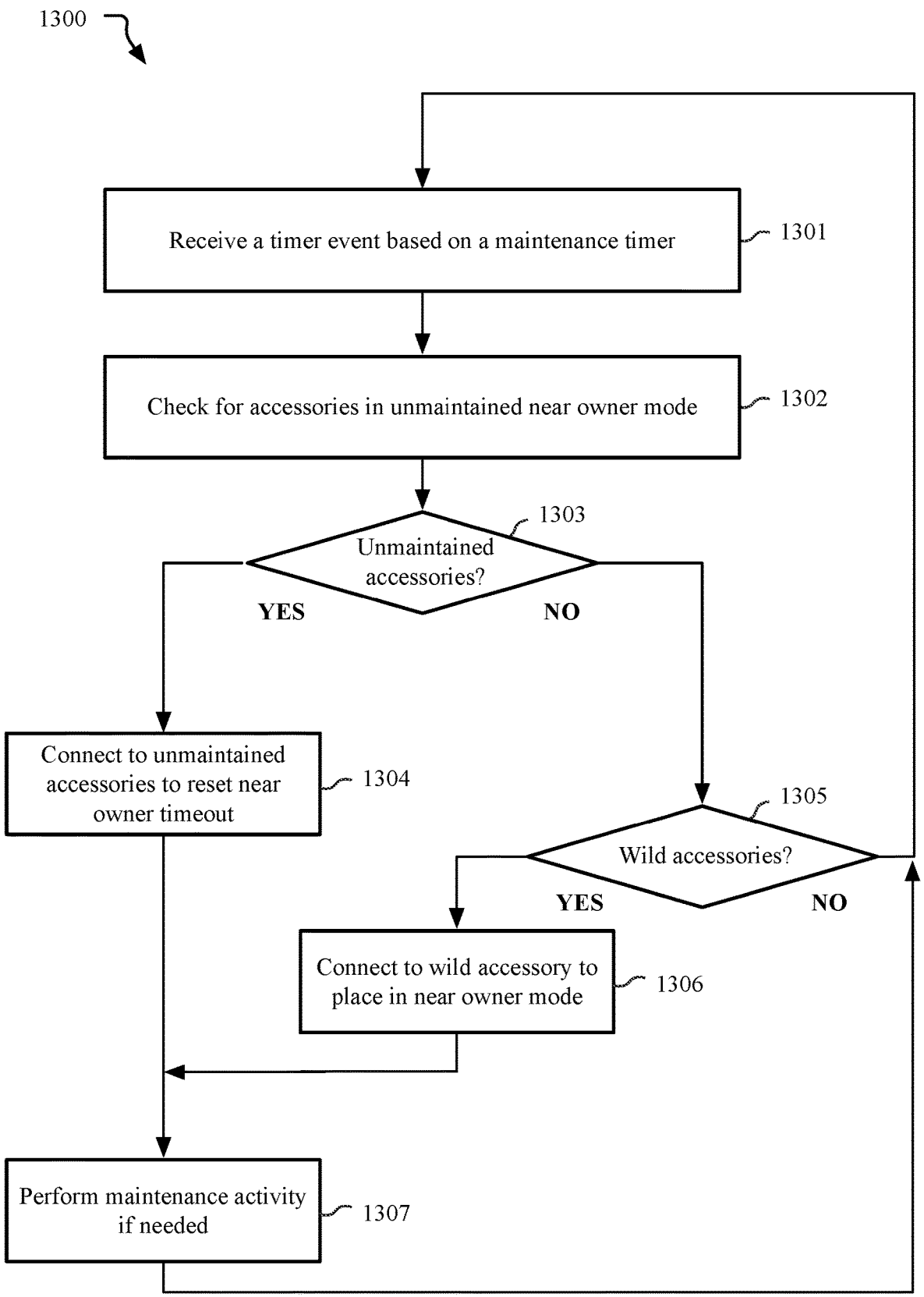
FIG. 13 illustrates a method performed by an electronic device to enable multi-device near owner maintenance for a wireless accessory.

FIG. 13 illustrates a method 1300 performed by an electronic device to enable multi-device near owner maintenance for a wireless accessory. The method 1300 can be performed by hardware and software logic of an electronic device described herein (e.g., electronic device 1200 of FIG. 12, mobile devices 102A-102B).

The operating system on the electronic device can receive a timer event that is based on a maintenance timer (block 1301). The maintenance timer can be a periodic timer that enables the electronic device to periodically check for nearby unmaintained wireless accessories (block 1302), which are accessories that in an unmaintained near owner mode according to the advertisement packet type and the maintained bit in the status field of the advertisement packet. The timer can be an opportunistic timer or a precise timer (e.g., backstop timer). The check for unmaintained accessories can include to read a scan buffer to determine if advertisement packets for wireless accessories have been received. The status field of those packets can be checked to determine a maintenance status for those accessories. The electronic device can also perform a wireless discovery scan to gather a current survey of nearby wireless devices and accessories to determine if any of those accessories can be maintained.

If any unmaintained accessories are detected (block 1303, YES), the electronic device can connect to the unmaintained accessories to reset near owner timeout (block 1304). The connection to the accessory, in this case, is an encrypted wireless connection. In response to receive of an encrypted wireless connection, the wireless accessory will set the maintained bit in the status field of the near owner advertisement packet until the end of the current key rotation period. This connection also causes the accessory to reset the near owner timeout for the accessory. The electronic device can then perform any needed maintenance activities on the wireless accessory (block 1307). Maintenance activities may include but are not limited to synchronizing timers, setting or resetting internal counters, and checking for error or crash logs.

If accessories in an unmaintained near owner mode are not detected (block 1303, NO), the electronic device can determine if any known accessories are beaconing in wild mode (block 1305). Wild mode accessories can be detected based on type fields in the header of the packet and/or based on the structure of the advertisement packet. Wild mode accessories that belong to other users may be noted for processing and other logic on the electronic device can transmit a location estimate for the accessory to a device locator server. Wild mode accessories that are known (e.g., owned by or shared with the user account on the electronic device) will be placed in near owner mode when detected. If no known accessories are detected as beaconing in wild mode (block 1305, NO), the electronic device can proceed with other activities or return to a low power state. If a known accessory is detected in wild mode (block 1305, YES), the electronic device can connect to the accessory to place the accessory into near owner mode (block 1306). The electronic device can then perform any needed maintenance activities on the wireless accessory (block 1307). In one embodiment, the electronic device can connect to known wild mode accessories as soon as those accessories are detected, even if not during a maintenance period. In one embodiment, the primary location services device associated with a user may connect with wireless accessories periodically, even if the accessory indicates that it has been maintained. In one embodiment, the electronic device can perform at least a portion of the operations of method 1300 while an application processor is in a low power state.

Additional Exemplary Electronic Devices

Figure 14:
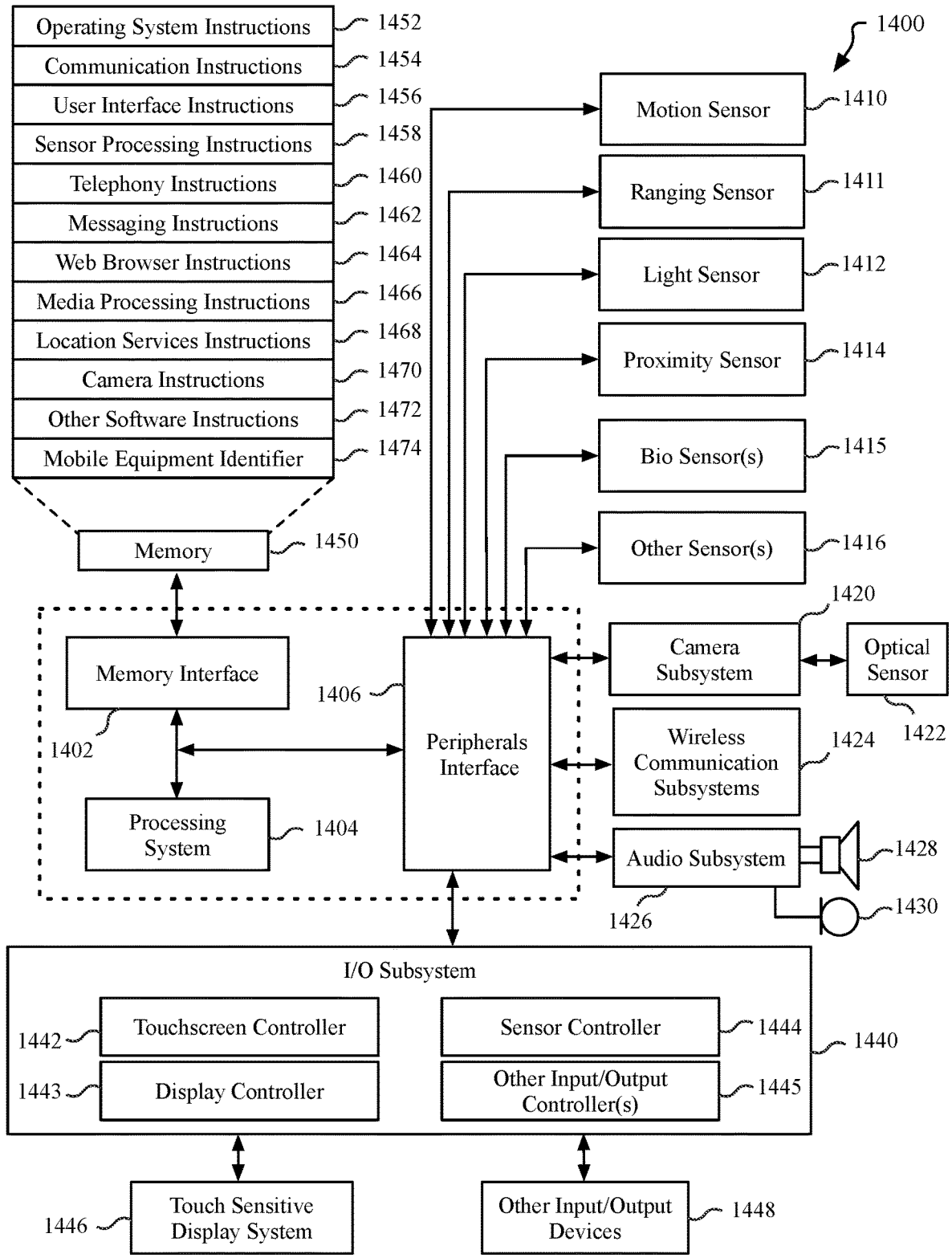
FIG. 14 is a block diagram of a device architecture for a mobile or embedded device, according to an embodiment.

FIG. 14 is a block diagram of a device architecture 1400 for a mobile or embedded device, according to an embodiment. The device architecture 1400 includes a memory interface 1402, a processing system 1404 including one or more data processors, image processors and/or graphics processing units, and a peripherals interface 1406. The various components can be coupled by one or more communication buses or signal lines. The various components can be separate logical components or devices or can be integrated in one or more integrated circuits, such as in a system on a chip integrated circuit.

The memory interface 1402 can be coupled to memory 1450, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1406 to facilitate multiple functionalities. For example, a motion sensor 1410, a ranging sensor 1411, a light sensor 1412, and a proximity sensor 1414 can be coupled to the peripherals interface 1406 to facilitate the mobile device functionality. The motion sensor 1410 can include an inertial measurement unit (IMU), which is a multi-axis sensor that that measures and reports the specific force, angular rate, and/or magnetic field experienced by a device. The ranging sensor 1411 can include an ultra-wideband radio transceiver that enables peer-to-peer ranging to be performed with other similarly equipped devices.

One or more biometric sensor(s) 1415 may also be present, such as a fingerprint scanner for fingerprint recognition or an image sensor for facial recognition. Other sensors 1416 can also be connected to the peripherals interface 1406, such as a positioning system (e.g., global positioning sensor (GPS) receiver), a temperature sensor, or other sensing device, to facilitate related functionalities. A camera subsystem 1420 and an optical sensor 1422, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1424, which can include radio frequency receivers and transmitters and/or optical (e.g., infrared) receivers and transmitters. The specific design and implementation of the wireless communication subsystems 1424 can depend on the communication network(s) over which a mobile device is intended to operate. For example, a mobile device including the illustrated device architecture 1400 can include wireless communication subsystems 1424 designed to operate over a GSM network, a CDMA network, an LTE network, a Wi-Fi network, a Bluetooth network, or any other wireless network. In particular, the wireless communication subsystems 1424 can provide a communications mechanism over which a media playback application can retrieve resources from a remote media server or scheduled events from a remote calendar or event server.

An audio subsystem 1426 can be coupled to a speaker 1428 and a microphone 1430 to facilitate voice-enabled functions, such as voice recognition, voice replication, digital recording, and telephony functions. In smart media devices described herein, the audio subsystem 1426 can be a high-quality audio system including support for virtual surround sound.

The I/O subsystem 1440 can include a touchscreen controller 1442 and/or other input controller(s) 1445. For computing devices including a display device, the touchscreen controller 1442 can be coupled to a touch sensitive display system 1446 (e.g., touchscreen). The touch sensitive display system 1446 and touchscreen controller 1442 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1446. Display output for the touch sensitive display system 1446 can be generated by a display controller 1443. In one embodiment, the display controller 1443 can provide frame data to the touch sensitive display system 1446 at a variable frame rate.

In one embodiment, a sensor controller 1444 is included to monitor, control, and/or processes data received from one or more of the motion sensor 1410, light sensor 1412, proximity sensor 1414, or other sensors 1416. The sensor controller 1444 can include logic to interpret sensor data to determine the occurrence of one of more motion events or activities by analysis of the sensor data from the sensors.

In one embodiment, the I/O subsystem 1440 includes other input controller(s) 1445 that can be coupled to other input/control devices 1448, such as one or more buttons, rocker switches, thumb-wheel, infrared port, USB port, and/or a pointer device such as a stylus, or control devices such as an up/down button for volume control of the speaker 1428 and/or the microphone 1430.

In one embodiment, the memory 1450 coupled to the memory interface 1402 can store instructions for an operating system 1452, including portable operating system interface (POSIX) compliant and non-compliant operating system or an embedded operating system. The operating system 1452 may include instructions for handling basic system services and for performing hardware dependent tasks. In some implementations, the operating system 1452 can be a kernel.

The memory 1450 can also store communication instructions 1454 to facilitate communicating with one or more additional devices, one or more computers and/or one or more servers, for example, to retrieve web resources from remote web servers. The memory 1450 can also include user interface instructions 1456, including graphical user interface instructions to facilitate graphic user interface processing.

Additionally, the memory 1450 can store sensor processing instructions 1458 to facilitate sensor-related processing and functions; telephony instructions 1460 to facilitate telephone-related processes and functions; messaging instructions 1462 to facilitate electronic-messaging related processes and functions; web browser instructions 1464 to facilitate web browsing-related processes and functions; media processing instructions 1466 to facilitate media processing-related processes and functions; location services instructions including GPS and/or navigation instructions 1468 and Wi-Fi based location instructions to facilitate location based functionality; camera instructions 1470 to facilitate camera-related processes and functions; and/or other software instructions 1472 to facilitate other processes and functions, e.g., security processes and functions, and processes and functions related to the systems. The memory 1450 may also store other software instructions such as web video instructions to facilitate web video-related processes and functions; and/or web shopping instructions to facilitate web shopping-related processes and functions. In some implementations, the media processing instructions 1466 are divided into audio processing instructions and video processing instructions to facilitate audio processing-related processes and functions and video processing-related processes and functions, respectively. A mobile equipment identifier, such as an International Mobile Equipment Identity (IMEI) 1474 or a similar hardware identifier can also be stored in memory 1450.

Each of the above identified instructions and applications can correspond to a set of instructions for performing one or more functions described above. These instructions need not be implemented as separate software programs, procedures, or modules. The memory 1450 can include additional instructions or fewer instructions. Furthermore, various functions may be implemented in hardware and/or in software, including in one or more signal processing and/or application specific integrated circuits.

Figure 15:
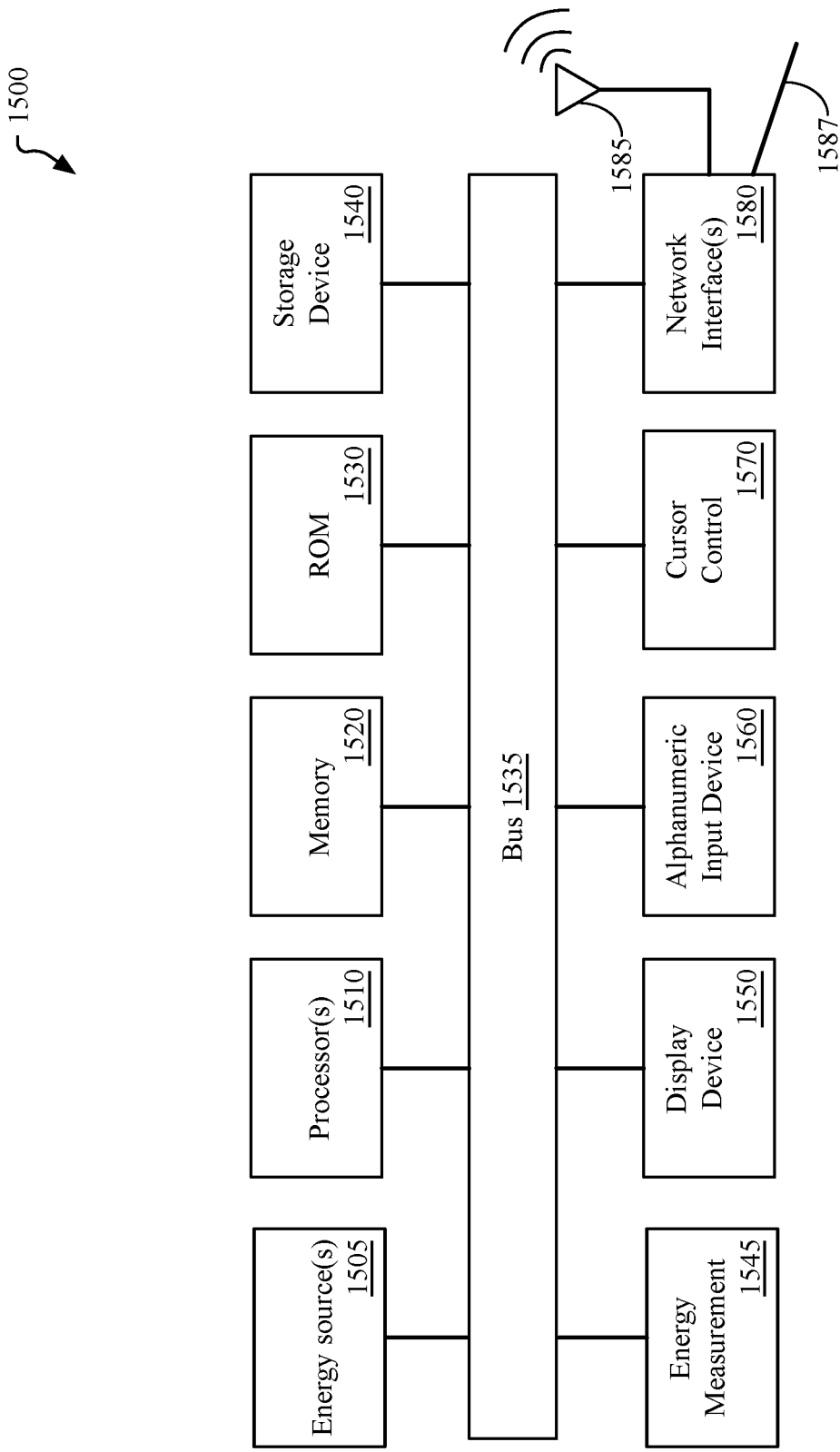
FIG. 15 is a block diagram of a computing system, according to an embodiment.

FIG. 15 is a block diagram of a computing system 1500, according to an embodiment. The illustrated computing system 1500 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1500 can be used to provide the computing device and/or a server device to which the computing device may connect.

The computing system 1500 includes bus 1535 or other communication device to communicate information, and processor(s) 1510 coupled to bus 1535 that may process information. While the computing system 1500 is illustrated with a single processor, the computing system 1500 may include multiple processors and/or co-processors. The computing system 1500 further may include memory 1520 in the form of random-access memory (RAM) or other dynamic storage device coupled to the bus 1535. The memory 1520 may store information and instructions that may be executed by processor(s) 1510. The memory 1520 may also be main memory that is used to store temporary variables or other intermediate information during execution of instructions by the processor(s) 1510.

The computing system 1500 may also include read only memory (ROM) 1530 and/or another data storage device 1540 coupled to the bus 1535 that may store information and instructions for the processor(s) 1510. The data storage device 1540 can be or include a variety of storage devices, such as a flash memory device, a magnetic disk, or an optical disc and may be coupled to computing system 1500 via the bus 1535 or via a remote peripheral interface.

The computing system 1500 may also be coupled, via the bus 1535, to a display device 1550 to display information to a user. The computing system 1500 can also include an alphanumeric input device 1560, including alphanumeric and other keys, which may be coupled to bus 1535 to communicate information and command selections to processor(s) 1510. Another type of user input device includes a cursor control 1570 device, such as a touchpad, a mouse, a trackball, or cursor direction keys to communicate direction information and command selections to processor(s) 1510 and to control cursor movement on the display device 1550. The computing system 1500 may also receive user input from a remote device that is communicatively coupled via one or more network interface(s) 1580.

The computing system 1500 further may include one or more network interface(s) 1580 to provide access to a network, such as a local area network. The network interface(s) 1580 may include, for example, a wireless network interface having antenna 1585, which may represent one or more antenna(e). The computing system 1500 can include multiple wireless network interfaces such as a combination of Wi-Fi, Bluetooth®, near field communication (NFC), and/or cellular telephony interfaces. The network interface(s) 1580 may also include, for example, a wired network interface to communicate with remote devices via network cable 1587, which may be, for example, an Ethernet cable, a coaxial cable, a fiber optic cable, a serial cable, or a parallel cable.

In one embodiment, the network interface(s) 1580 may provide access to a local area network, for example, by conforming to IEEE 802.11 wireless standards and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1580 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, a fifth generation (5G) communication protocol, and/or any other type of wireless communications protocol.

The computing system 1500 can further include one or more energy sources 1505 and one or more energy measurement systems 1545. Energy sources 1505 can include an AC/DC adapter coupled to an external power source, one or more batteries, one or more charge storage devices, a USB charger, or other energy source. Energy measurement systems include at least one voltage or amperage measuring device that can measure energy consumed by the computing system 1500 during a predetermined period of time. Additionally, one or more energy measurement systems can be included that measure, e.g., energy consumed by a display device, cooling subsystem, Wi-Fi subsystem, or other frequently used or high-energy consumption subsystem.

Reference herein to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow can be performed by processing logic that comprises hardware (e.g. circuitry, dedicated logic, etc.), software (as instructions on a non-transitory machine-readable storage medium), or a combination of both hardware and software. Reference will be made in detail to various embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used herein is for the purpose of describing particular embodiments only and is not intended to be limiting as to all embodiments. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Computing devices, user interfaces for such devices, and associated processes for using such devices are described herein. In some embodiments, the computing device is a portable communications device such as a mobile telephone that also contains other functions, such as PDA and/or music player functions. Exemplary portable multifunction devices include, without limitation, the iPhone®, iPad®, and iPod Touch® devices from Apple Computer, Inc. of Cupertino, California. In the description and figures of this application, where a wireless device, wireless accessory, or wireless accessory device is described or illustrated, unless stated otherwise the described or illustrated attributes can generally be applied to any type of wireless device, wirelesses accessory, wireless accessory device, or other form of electronic device that includes a wireless communication subsystem that is capable of broadcasting a wireless beacon within the electromagnetic spectrum.

In the foregoing description, example embodiments have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Embodiments described herein provide a technique to arbitrate the maintenance of a wireless accessory between multiple owner devices. The presence of a wireless device and/or accessory that cannot maintain an independent network connection can be detected by network connected wireless devices and the location of the detected device and/or accessory can be reported to a device location service. As the wireless devices and/or accessories do not have independent network connections, periodic maintenance is performed on those devices by nearby owner devices to which the wireless devices and/or accessories are paired or associated. Without an arbitration mechanism, various owner devices may continually attempt to perform maintenance operations on nearby wireless accessories.

One embodiment provides as method performed on a wireless device. The method comprises establishing a first encrypted wireless connection with a first electronic device, where the first encrypted wireless connection is established using cryptographic material associated with a first key rotation period. The method additionally includes setting an indicator in a status field of a first wireless advertisement packet type. The first wireless advertisement packet type is associated with a first broadcast mode and the indicator indicates that the wireless device has been maintained during the first key rotation period. The method on the wireless device additionally includes broadcasting a wireless beacon having the first advertisement packet type and, in response to disconnecting from the encrypted wireless connection, starting a counter associated with a timeout period. The timeout triggers the wireless device to transition to a second broadcast mode. The wireless device will periodically transition rotate to a new cryptographic key for use in establishing encrypted connections with the device. During a transition from the first key rotation period to a second key rotation period, the wireless device can reset the indicator in the status field of the first wireless advertisement packet type. In response to establishing a second encrypted wireless connection with a second electronic device, the electronic device can reset the counter associated with the timeout period. The second encrypted wireless connection is established using cryptographic material associated with the second key rotation period. The second wireless device is associated with the first electronic device, and can receive the cryptographic material from the first electronic device or via a storage repository that is shared with the first electronic device.

One embodiment provides a data processing system on a wireless device comprising a memory device and one or more processors to execute instructions stored in the memory device, wherein the instructions cause the one or more processors to perform operations to establish a first encrypted wireless connection with a first electronic device and in response to establishment of the first encrypted wireless connection: set an indicator in a status field of a first wireless advertisement packet type, wherein the indicator indicates that a maintenance operation has been performed on the wireless device during a first key rotation period and broadcast a wireless beacon having the first wireless advertisement packet type. In response to disconnection from the first encrypted wireless connection, the data processing system can start a counter associated with a timeout period. Expiration of the timeout period can trigger the wireless device to transition from a first broadcast mode to a second broadcast mode. The data processing system can then establish a second encrypted wireless connection with a second electronic device. The second electronic device can be associated with an account shared with the first electronic device. The data processing system can then reset the counter associated with the timeout period after the second encrypted wireless connection is established.

One embodiment provides a non-transitory machine-readable medium storing instructions to cause one or more processors of a wireless device to perform operations comprising establishing a first encrypted wireless connection with a first electronic device, where the first encrypted wireless connection is established using cryptographic material associated with a first key rotation period. The operations additionally include setting an indicator in a status field of a first wireless advertisement packet type. The first wireless advertisement packet type is associated with a first broadcast mode and the indicator indicates that the wireless device has been maintained during the first key rotation period. The operations additionally broadcasting a wireless beacon having the first advertisement packet type and, in response to disconnecting from the encrypted wireless connection, starting a counter associated with a timeout period. The timeout triggers the wireless device to transition to a second broadcast mode. The wireless device will periodically transition rotate to a new cryptographic key for use in establishing encrypted connections with the device. During a transition from the first key rotation period to a second key rotation period, the wireless device can reset the indicator in the status field of the first wireless advertisement packet type. In response to establishing a second encrypted wireless connection with a second electronic device, the electronic device can reset the counter associated with the timeout period.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A method on an electronic device, the method comprising:
upon expiration of a maintenance timeout period, retrieving a wireless advertisement packet that was received from a wireless device, wherein the maintenance timeout period corresponds to a period of time to check for unmaintained wireless devices; and
in response to determining that a status field of the received wireless advertisement packet indicates that a maintenance operation needs to be performed:
establishing a wireless connection with the wireless device; and
sending a request to the wireless device to perform the maintenance operation, wherein the maintenance operation comprises a reset of a counter on the wireless device associated with a timeout period for the wireless device to switch broadcast modes.

2. The method as in claim 1, further comprising:
retrieving the wireless advertisement packet from a scan buffer; and
accessing the status field of the wireless advertisement packet to determine whether the maintenance operation needs to be performed.

3. The method as in claim 1, wherein the wireless advertisement packet type is associated with a first broadcast mode.

4. The method as in claim 1, wherein the wireless connection is established using cryptographic material associated with a key rotation period.

5. The method as in claim 1, further comprising:
resetting a timer at the wireless device; and
checking the wireless device for an error log.

6. The method as in claim 1, further comprising:
transmitting a location estimate for the wireless device.

7. The method as in claim 1, wherein the electronic device is in a low power mode.

8. A data processing system on a wireless device comprising:
a memory device; and
one or more processors to execute instructions stored in the memory device, wherein the instructions cause the one or more processors to perform operations to:
upon expiration of a maintenance timeout period, retrieve a wireless advertisement packet that was received from a wireless device, wherein the maintenance timeout period corresponds to a period of time to check for unmaintained wireless devices; and
in response to a determination that a status field of the received wireless advertisement packet indicates that a maintenance operation needs to be performed:
establish a wireless connection with the wireless device; and
send a request to the wireless device to perform the maintenance operation, wherein the maintenance operation comprises a reset of a counter on the wireless device associated with a timeout period for the wireless device to switch broadcast modes.

9. The data processing system as in claim 8, the one or more processors to perform operations to:
retrieve the wireless advertisement packet from a scan buffer; and
access the status field of the wireless advertisement packet to determine whether the maintenance operation needs to be performed.

10. The data processing system as in claim 8, wherein the wireless advertisement packet type is associated with a first broadcast mode.

11. The data processing system as in claim 8, wherein the wireless connection is established using cryptographic material associated with a key rotation period.

12. The data processing system as in claim 8, the one or more processors to perform operations to:
reset a timer at the wireless device; and
check the wireless device for an error log.

13. The data processing system as in claim 8, the one or more processors to perform operations to:
transmit a location estimate for the wireless device.

14. The data processing system as in claim 8, wherein the electronic device is in a low power mode.

15. A non-transitory machine-readable medium storing instructions to cause one or more processors of a wireless device to perform operations comprising:
upon expiration of a maintenance timeout period, retrieving a wireless advertisement packet that was received from a wireless device, wherein the maintenance timeout period corresponds to a period of time to check for unmaintained wireless devices; and
in response to determining that a status field of the received wireless advertisement packet indicates that a maintenance operation needs to be performed:
establishing a wireless connection with the wireless device; and
sending a request to the wireless device to perform the maintenance operation, wherein the maintenance operation comprises a reset of a counter on the wireless device associated with a timeout period for the wireless device to switch broadcast modes.

16. The non-transitory machine-readable medium of claim 15, the operations further comprising:
retrieving the wireless advertisement packet from a scan buffer; and
accessing the status field of the wireless advertisement packet to determine whether the maintenance operation needs to be performed.

17. The non-transitory machine-readable medium of claim 15, wherein the wireless advertisement packet type is associated with a first broadcast mode.

18. The non-transitory machine-readable medium of claim 15, wherein the wireless connection is established using cryptographic material associated with a key rotation period.

19. The non-transitory machine-readable medium of claim 15, the operations further comprising: transmitting a location estimate for the wireless device.

* * * * *